(12) United States Patent
Dotson et al.

(10) Patent No.: US 9,346,317 B2
(45) Date of Patent: May 24, 2016

(54) NON-PNEUMATIC TIRE WITH REINFORCEMENT BAND SPACER AND METHOD OF MANUFACTURING SAME

(75) Inventors: Michael Edward Dotson, Greenville, SC (US); Rush Marler, Greenville, SC (US); Patrick A. Petri, Greer, SC (US); Kirkland W. Vogt, Simpsonville, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 374 days.

(21) Appl. No.: 13/977,441

(22) PCT Filed: Jun. 30, 2011

(86) PCT No.: PCT/US2011/042533
§ 371 (c)(1),
(2), (4) Date: Jun. 28, 2013

(87) PCT Pub. No.: WO2012/091755
PCT Pub. Date: Jul. 5, 2012

(65) Prior Publication Data
US 2013/0278044 A1    Oct. 24, 2013

Related U.S. Application Data

(60) Provisional application No. 61/428,074, filed on Dec. 29, 2010.

(51) Int. Cl.
*B60C 7/08* (2006.01)
*B60C 7/10* (2006.01)
(Continued)

(52) U.S. Cl.
CPC . *B60B 9/26* (2013.01); *B29D 30/02* (2013.01); *B60B 1/06* (2013.01); *B60C 7/00* (2013.01); *B60C 7/105* (2013.04); *B60C 7/22* (2013.01); *Y10T 29/49538* (2015.01)

(58) Field of Classification Search
CPC ........... B29D 30/02; B29D 2030/0655; B29D 30/0661; B32B 1/08; B32B 5/18; B32B 5/28; B32B 27/04; B32B 27/12; B60B 1/06; B60B 9/26; B60C 7/00; B60C 7/102; B60C 7/105; B60C 7/18; B60C 7/20; B60C 7/22; B60C 9/18; B60C 11/0306; B60C 11/04; B60C 17/00; Y10T 29/49538; Y10T 152/1018; Y10T 29/49492
See application file for complete search history.

(56) References Cited

U.S. PATENT DOCUMENTS

| 1,440,974 A | 2/1923 | Dornburgh |
| 1,495,083 A | 5/1924 | Krusemark |

(Continued)

FOREIGN PATENT DOCUMENTS

| BR | 199902986 A | 3/2000 |
| EP | 0073313 A2 | 3/1983 |

(Continued)

OTHER PUBLICATIONS

PCT International Search Report for PCT/US2011/030467, dated Jun. 13, 2011.

(Continued)

*Primary Examiner* — Alexander P Taousakis
(74) *Attorney, Agent, or Firm* — Dority & Manning, P.A.

(57) ABSTRACT

A non-pneumatic tire and a method of manufacturing the same are provided. More particularly, a non-pneumatic tire having a reinforcement structure with one or more spacers is provided along with a method of placement of a spacer between reinforcing bands of a non-pneumatic tire. A jig can be used to facilitate placement of the spacer.

17 Claims, 17 Drawing Sheets

(51) Int. Cl.
  *B60B 1/06* (2006.01)
  *B60B 9/26* (2006.01)
  *B29D 30/02* (2006.01)
  *B60C 7/22* (2006.01)
  *B60C 7/00* (2006.01)

(56) References Cited

U.S. PATENT DOCUMENTS

| | | | |
|---|---|---|---|
| 2,388,421 | A | 11/1945 | Kraft et al. |
| 3,779,835 | A | 12/1973 | Lohr et al. |
| 3,973,613 | A | 8/1976 | Marzocchi |
| 4,024,895 | A | 5/1977 | Barron |
| 4,073,330 | A | 2/1978 | Allard |
| 4,456,048 | A * | 6/1984 | Markow et al. ............... 152/517 |
| 4,734,144 | A | 3/1988 | Markow |
| 4,794,966 | A | 1/1989 | Markow |
| 4,966,212 | A | 10/1990 | Hill |
| 5,221,382 | A | 6/1993 | Sid-Ahmed |
| 5,265,659 | A | 11/1993 | Pajtas et al. |
| 5,565,257 | A | 10/1996 | Tingley |
| 5,837,077 | A | 11/1998 | Kabe et al. |
| 5,906,836 | A | 5/1999 | Panaroni et al. |
| 6,109,319 | A | 8/2000 | Gardetto |
| 6,422,279 | B1 | 7/2002 | Williams et al. |
| 6,460,586 | B1 | 10/2002 | Spragg et al. |
| 6,470,937 | B1 | 10/2002 | Spragg et al. |
| 6,701,987 | B1 | 3/2004 | Abbott |
| 6,769,465 | B2 * | 8/2004 | Rhyne et al. ............... 152/197 |
| 6,792,986 | B2 | 9/2004 | Allen et al. |
| 6,994,134 | B2 | 2/2006 | Grah |
| 7,013,939 | B2 | 3/2006 | Rhyne et al. |
| 7,125,083 | B2 | 10/2006 | Piumarta et al. |
| 7,363,805 | B2 | 4/2008 | Jayakumar et al. |
| 7,418,988 | B2 | 9/2008 | Cron et al. |
| 7,650,919 | B2 | 1/2010 | Rhyne et al. |
| 2004/0012246 | A1 * | 1/2004 | Rhyne et al. ............... 301/55 |
| 2004/0159385 | A1 * | 8/2004 | Rhyne et al. ............... 152/197 |
| 2007/0267116 | A1 | 11/2007 | Rhyne et al. |
| 2008/0250843 | A1 | 10/2008 | Albohr et al. |
| 2008/0314486 | A1 | 12/2008 | Manesh et al. |
| 2009/0071584 | A1 | 3/2009 | Zhang et al. |
| 2010/0018621 | A1 | 1/2010 | Thompson |
| 2010/0200131 | A1 * | 8/2010 | Iwase et al. ............... 152/209.1 |
| 2011/0223366 | A1 | 9/2011 | Petri et al. |
| 2012/0193004 | A1 * | 8/2012 | Anderson et al. ............ 152/310 |
| 2012/0279622 | A1 * | 11/2012 | Russell ............... 152/17 |
| 2012/0318417 | A1 * | 12/2012 | Dotson et al. ............ 152/17 |
| 2013/0240272 | A1 * | 9/2013 | Gass et al. ............... 180/54.1 |
| 2013/0342001 | A1 * | 12/2013 | Imamiya et al. ............ 301/6.5 |

FOREIGN PATENT DOCUMENTS

| | | |
|---|---|---|
| EP | 0400859 A2 | 12/1990 |
| EP | 853009 A2 | 7/1998 |
| EP | 974449 A2 | 1/2000 |
| EP | 1980420 A1 | 10/2008 |
| GB | 1257017 | 12/1971 |
| WO | WO 94/11185 A1 | 5/1994 |
| WO | WO 02/43974 A1 | 6/2002 |
| WO | WO 03/018332 A1 | 3/2003 |
| WO | WO 2005/007422 A1 | 1/2005 |
| WO | WO 2008/045098 A1 | 4/2008 |
| WO | WO 2008/050503 A1 | 5/2008 |
| WO | WO 2008/102048 A1 | 8/2008 |
| WO | WO 2009/005946 A1 | 1/2009 |

OTHER PUBLICATIONS

PCT International Search Report for PCT/US2011/050905, dated Jul. 14, 2008.
PCT International Search Report for PCT/US2011/042310, dated Nov. 3, 2011.
PCT International Search Report for PCT/US2009/060746, dated Jan. 12, 2010.
PCT International Search Report for PCT/US2011/042533, dated Dec. 6, 2011.

* cited by examiner

NON-PNEUMATIC TIRE WITH REINFORCEMENT BAND SPACER AND METHOD OF MANUFACTURING SAME

PRIORITY CLAIM

This application claims the benefit of priority to U.S. patent application Ser. No. 12/661,196, filed Mar. 12, 2010 and U.S. Provisional Patent Application No. 61/428,074, filed Dec. 29, 2010, which are incorporated herein by reference for all purposes.

FIELD OF THE INVENTION

The present invention relates to a non-pneumatic wheel with a reinforcement structure that includes at least one spacer and a method of manufacturing the same.

BACKGROUND OF THE INVENTION

The pneumatic tire is a known solution for compliance, comfort, mass, and rolling resistance; however, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Conventional solid tires, spring tires, and cushion tires, although lacking the need for maintenance and the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires.

Spring tires typically have a rigid wood, metal, or plastic ring with springs or spring like elements connecting it to a hub. While the hub is thereby suspended by the springs, the inflexible ring has only a small contact area with the road, which offers essentially no compliance, and provides poor traction and steering control.

Accordingly, a non-pneumatic wheel and a process for manufacturing a non-pneumatic wheel having performance characteristics similar to a pneumatic wheel would be useful. More particularly, a wheel and a method for manufacturing a non-pneumatic wheel that does not require an air inflation pressure in order to provide performance characteristics of a pneumatic tire would be beneficial. Such a wheel, and a method of making such wheel, having a hub or capable of being connected to a hub for mounting on a vehicle or other transport device would also be very useful.

SUMMARY OF THE INVENTION

Aspects and advantages of the invention will be set forth in part in the following description, or may be obvious from the description, or may be learned through practice of the invention.

In the one exemplary aspect, the present invention provides a method of manufacturing a non-pneumatic tire having an annular reinforcement structure that includes a first reinforcement band, a second reinforcement band, and a resilient spacing element positioned between the first and second reinforcement bands. The method includes the steps of placing the resilient spacing element against a face of the first reinforcement band; compressing the spacing element against the face of the first reinforcement band at a location adjacent a top edge of the first reinforcement band; sliding the second reinforcement band in an axial direction relative to the first reinforcement band and from the top edge of the first reinforcement band towards a bottom edge of the first reinforcement band while the spacing element is compressed so as to place the first and second reinforcement bands into a concentric relationship; and, allowing the spacing element to press against the first and second reinforcement band to retain the spacing element between the first and second reinforcement bands.

In another exemplary aspect, the present invention provides a method of manufacturing a non-pneumatic tire with an annular reinforcement structure that includes a first reinforcement band, a second reinforcement band, and a resilient spacing element positioned between the first and second reinforcement bands. The method includes the steps of placing a resilient spacing element adjacent to the first reinforcement band and against a face of the first reinforcement band; pressing the resilient spacing element against the face of the first reinforcement band; sliding the second reinforcement band in an axial direction relative to the first reinforcement band and from a first edge of the first reinforcement band towards a second edge of the first reinforcement band during said step of pressing such that the first and second reinforcement bands are placed into a concentric relationship; and, releasing the spacing element to press against the first and second reinforcement band and retain the spacing element between the first and second reinforcement bands.

In still another exemplary embodiment, the present invention provides a non-pneumatic wheel that defines radial and circumferential directions. The wheel includes an annular band for supporting a ground contacting tread portion. The annular band extends about the circumferential direction. An annular reinforcement structure is positioned within the annular band. The reinforcement structure includes an inner reinforcement band extending along the circumferential direction; an outer circumferential band extending along the circumferential direction and positioned radially-outside of said inner reinforcement band; a foam spacer positioned at least partially between said inner and outer reinforcement bands. The foam spacer is constructed as a plurality of discrete shims positioned along the circumferential direction between the inner reinforcement band and the outer reinforcement band. A mounting band is positioned radially-inward of the annular band. A plurality of web spokes are connected between the annular band and the mounting band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides a non-pneumatic tire and a method of manufacturing the same. More particularly, a non-pneumatic tire having a reinforcement structure with one or more spacers is provided along with a method of placement of a spacer between reinforcing bands of a non-pneumatic tire. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Without limiting the scope of the invention, the preferred embodiments and features are hereinafter set forth. All of the United States patents, published applications and unpublished pending applications, which are cited in the specification, are hereby incorporated by reference. Unless otherwise indicated, conditions are 25° C., 1 atmosphere of pressure and 50% relative humidity, concentrations are by weight, and molecular weight is based on weight average molecular weight. The term "polymer" or "polymeric foam" as used in the present application denotes a material having a weight average molecular weight (Mw) of at least 5,000. Such polymeric materials can be amorphous, crystalline, semi-crystalline or elastomeric polymeric materials.

Figure 1:
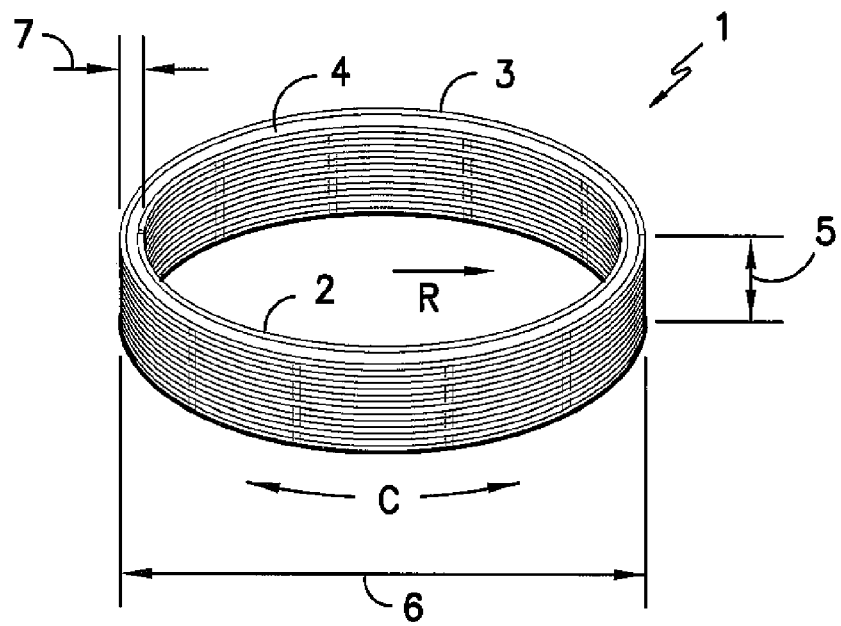
FIG. 1 is a top perspective view of an exemplary embodiment of an annular reinforcement structure as may be used in a non-pneumatic tire.
Figure 2:
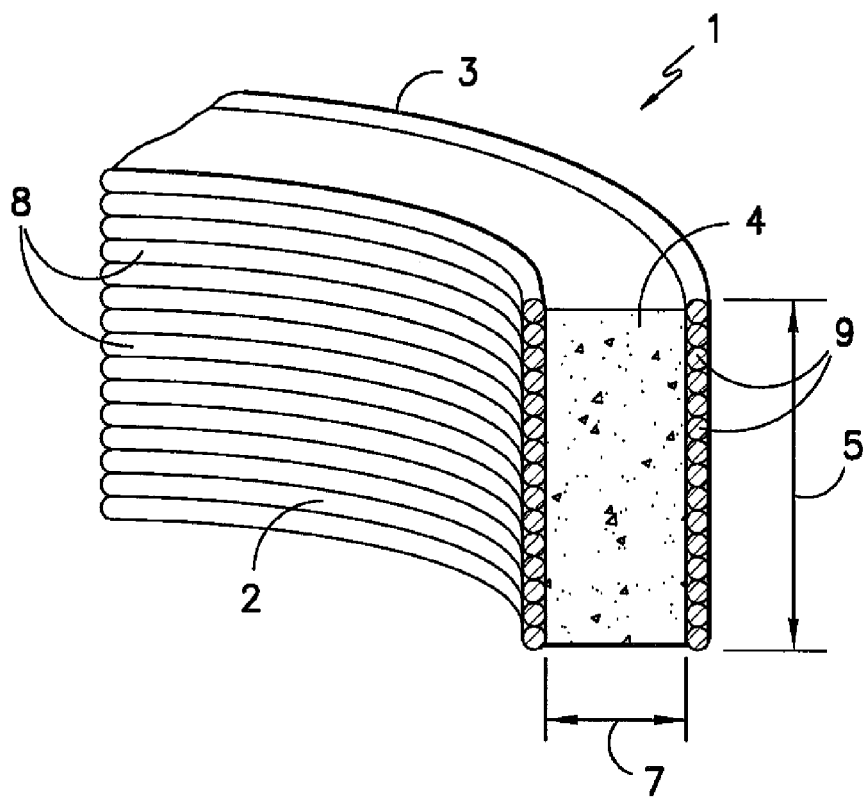
FIG. 2 is a cut-away perspective view of the annular reinforcement structure of FIG. 1.

Referring to FIGS. 1 and 2, an exemplary embodiment of an annular reinforcement structure 1 is shown with an inner reinforcement band 2, outer reinforcement band 3, and a spacing element 4 that may be comprised of a polymer foam. The reinforcement structure may be made with a range of dimensions. By way of example, the width 5 of the annular reinforcement structure, also referred to herein as the width in the axial direction A, may range from 0.5 inches to 5.5 feet, and the outside diameter 6 may range from 3 inches to 13 feet. By way of example, the distance between the inner reinforcement band 2 and the outer reinforcement band 3, when the bands are concentric, shown as radial thickness 7, may range from 2 mm to 25 mm.

In various embodiments of the invention it is desirable to allow for relative movement of the inner and outer reinforcement bands 2 and 3 within annular reinforcement structure 1, such as may be caused by flexing or shear forces. In such circumstances, the annular reinforcement band may be provided with a minimum radial thickness 7 of 5 mm, between the inner and outer reinforcement bands. Applications for the annular reinforcement structure 1 of the present invention, including suitable structures, alignment, and spacing of the reinforcement bands, may be found e.g., in U.S. Pat. No. 6,769,465 B2 and U.S. Pat. No. 7,650,919 B2.

Each of the reinforcement bands 2 and 3 is a circular strip, characterized as being flexible in the radial direction R and relatively inextensible in circumferential direction C. In one embodiment of the invention, the reinforcement bands 2 and 3 are sufficiently flexible to be subjected to a bend radius that is one-tenth or less of the radius of the band when the band is oriented in the shape of a circle, without experiencing a permanent set in the band. The inner and outer reinforcement bands 2 and 3 may be the same or different, both in terms of materials of construction and design.

An advantage of the present invention is that it may be practiced without significant deflection or distortion of the reinforcement bands 2 and 3. Thus, while the reinforcement bands 2 and 3 may be flexible in a radial direction, it is often desirable to avoid manufacturing steps that will require the reinforcement bands, especially the inner reinforcement band 2, to be crimped inward during assembly of the annular reinforcement structure 1.

By way of example, reinforcement bands 2 and/or 3 may be a woven or nonwoven textile structure, arrangement of monofilament and/or multifilament cords, bi-component yarns, spun yarns, braided cords, single or multilayer sheets of polymers or metals, or a combination of the foregoing materials. By way of further example, the reinforcement bands 2 and/or 3 may be constructed of fiberglass, rayon, nylon, aramid, polyester, carbon or metal, such as steel. The materials may be treated to improve performance, allow for easier manufacturing and/or improve bond strength between materials. Examples include brass-plated steel, elastomer coated cords and the use of adhesion promoters, such as resorcinol-formaldehyde latex. Further examples of suitable reinforcement bands may be found in belts for power transmission, hoses, tires, rollers, strapping, and gaskets.

By way of further example, materials having a Young's modulus (lb/in$^2$), of 5,000,000 or greater, or even 10,000,000 or greater, are useful herein. Alternatively, the stiffness of the reinforcement bands 2 and/or 3 and the matrix material filling the interstices in the polymer foam spacer 4 may be characterized by a relative Young's modulus of 1,000:1 or even 10,000:1, respectively.

In one example, the reinforcement band 2 and/or 3 may be a monofilament or multi-filament cord wound into a helix and making at least three revolutions. The multiple windings of the cord may be held together by rigid or flexible ribs arranged perpendicular to the cords, such as a yarn intertwined between adjacent cords, for example by weaving or knitting. The intertwined yarn may include fibers that can be melted to fuse the structure together, thereby providing stability to the band, especially in the axial direction. Examples of useful reinforcement band structures may be found in pending U.S. patent application Ser. No. 12/661,196, filed Mar. 12, 2010, which is hereby incorporated by reference.

FIGS. 1 and 2 show inner reinforcement band 2 and outer reinforcement band 3 constructed of cord 8 and cord 9, respectively, wound into helixes. Also within the scope of the invention is the use of multi-ply reinforcement bands. For example, layers of reinforcement material may overlay one another, perhaps joined by a suitable binder, adhesive, or stitch bond. The plies may be oriented parallel to each other or at an angle, for example, by winding one ply around the other in a spiral. The multi-ply structures are considered as a single reinforcement band herein.

Figure 3:
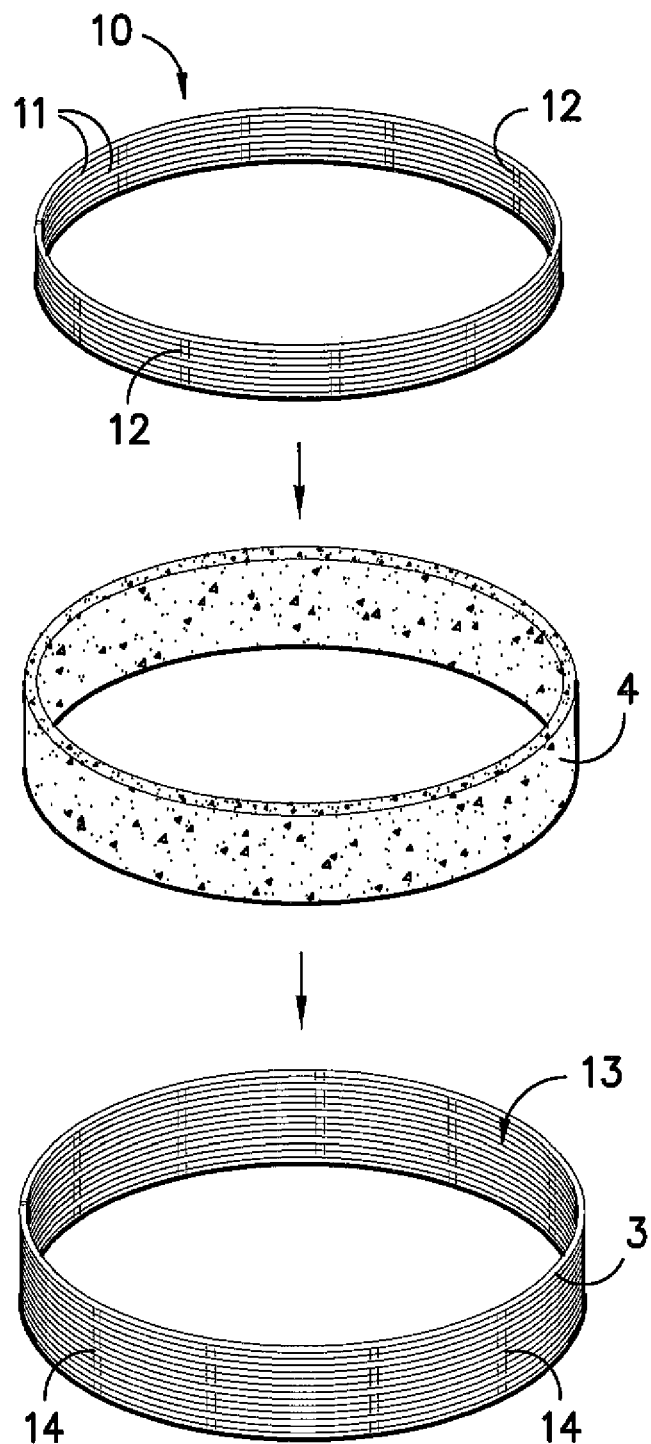
FIG. 3 is an exploded perspective view of an exemplary embodiment of a jig, spacing element, and outer reinforcement band.

The spacing element 4, an exemplary embodiment of which is shown e.g., FIG. 3, may be a polymer foam structure, such as a polyurethane foam. In addition to polyurethane foam, which includes polyester-polyurethanes and polyether-polyurethanes, examples of polymer foams include polystyrene, polyolefin, in particular polyethylene and polypropylene, polyvinyl chloride, latex rubber, viscoelastic and melamine resin foams. The cell structure of the foam can be controlled by suitable blowing agents, chemical and/or physical. Other additives, such as initiators, catalysts, cross-linking agents, and plasticizers, can be added to promote the reaction and modify the chemical and mechanical properties of the foam.

The foam may be an open-cell or closed-cell foam. Generally, open-cell foam is believed to provide a greater range of applications, particularly when the annular reinforcement structure 1 is embedded in a matrix material and the matrix material fills voids in the polymer foam spacer 4, as discussed in more detail herein. By way of example, the polymer foams may have a fraction of voids to net volume of foam of 75% or greater, 85% or greater or even 95% or greater. The void fraction may be increased by reticulating the polymer foam spacer 4, for example, by combustion or chemical degradation. It may be advantageous to remove any "skin" formed on the outer surface of the polymer foam spacer 4, prior to reticulating the foam. Reticulated polyurethane foam having a fraction of voids to net volume of 90% or greater has been found to be particularly useful.

Another material useful as the spacing element is a nonwoven textile material. By way of example, nonwoven textile materials with thick filaments that are crimped or textured, such as a two or three dimensional corrugated configuration, are believed to be useful in the present invention. Nonwovens with thickness oriented fibers ("z" oriented fibers) can provide resilient properties to the nonwoven.

Yet another material useful as a spacing element 4 is a woven or knitted textile fabric. By way of example, the spacing element 4 may be a fabric that has two face layers separated by fibers or yarns extending between the two layers. The fibers between the two layers provide a spring-like force that opposes the compression of the fabric. The fabric can be designed to meet design parameters, such as openness, pore shape, pore size, stiffness, direction of the separating fiber or yarn, affinity of the fabric to the matrix material, and the like.

Spacing elements 4 having a wide range of physical properties, such as resilience, cell structure and porosity can be employed, depending upon the intended application of the annular reinforcement structure. For most applications, it is desirable that the spacing element 4 has sufficient resilience to be handled without damage, yet be capable of maintaining the relative spacing and alignment of the inner and outer reinforcement bands 2 and 3 during subsequent manufacturing steps. In one embodiment of the invention, the polymer foam spacer 4 is elastomeric, that is, the spacer 4 can elastically recover from 30% compression or greater. Polymer foam spacers that can elastically recover from 50% compression, or even from 80% compression or greater, may be advantageous in certain applications.

The spacing element 4 is preferably thicker in the radial direction than the radial distance between the inner and outer reinforcement bands 2 and 3, when such bands are positioned concentrically. Accordingly, when the annular reinforcement structure 1 is assembled, the spacing element 4 will frictionally engage the outside face of the inner reinforcement structure 2 and the inside face of the outer reinforcement structure 3, to maintain the relative position of the components. By way of example, the radial thickness of the spacing element 4 may be 5% or greater, or even 10% or greater, than the radial distance between the inner and outer reinforcement bands 2 and 3, when such bands are positioned concentrically. Providing a spacing element with substantially uniform thickness in the radial direction promotes even pressure against the inner and outer reinforcement bands 2 and 3, around the circumference of the annular reinforcement structure 1.

The shape of the spacing element 4 may be an annular band, which includes a strip of material formed into a continuous ring, or a strip of material formed into a ring, with the loose ends loosely abutting each other or in close proximity. The annular band 2 or 3 is preferably flexible, such that the spacing element 4 can be deformed to facilitate inserting the spacing element against the inner face (FIGS. 3 and 8) of the outer reinforcement band 3, during assembly of the annular reinforcement structure 1, without causing permanent deformation. By way of example, the spacing element 4 can be subjected to a bend radius that is one-tenth or less of its normal (unflexed) inside diameter, without experiencing a permanent set to the material.

Figure 6:
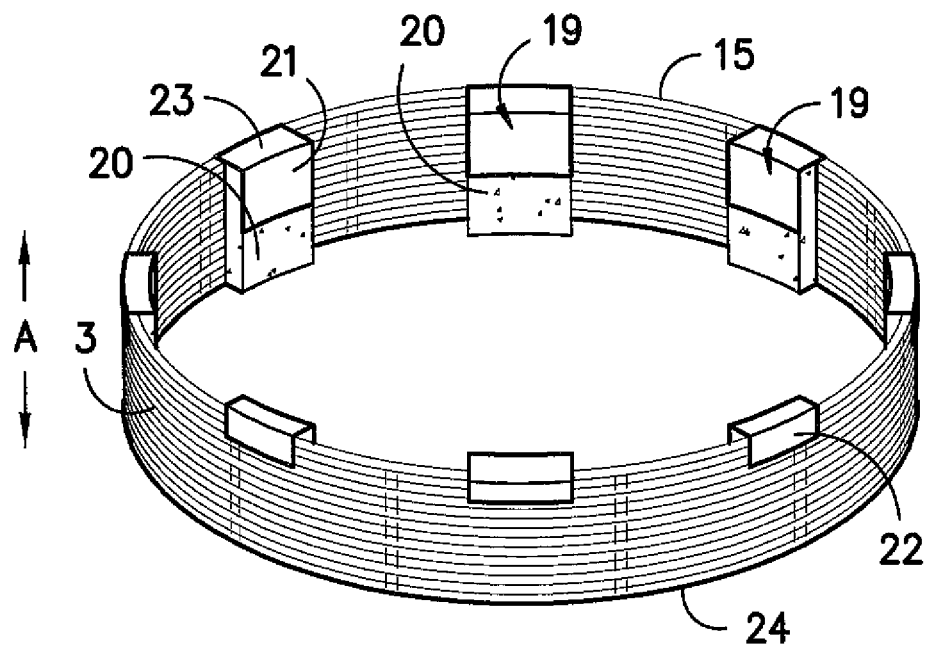
FIG. 6 is a top perspective view of another exemplary embodiment of a jig, spacing element, and outer reinforcement band, wherein the spacing element is a plurality of discrete shims.

Alternatively, the spacing element 4 may be a plurality of discrete shims 20, spaced around the circumference of the annular reinforcement structure 1, as shown in FIG. 6, whereby the number and size of the shims 20 is sufficient to maintain the relative alignment of the inner and outer reinforcement bands 2 and 3 during handling and subsequent manufacturing steps. By way of example, an annular reinforcement structure 1 having an outer circumference of 30 inches, may be supported by from 2 to 15 shims 20 evenly distributed around the circumference. The discrete spacing elements 20 may be a polymer foam or textile material, as previously described.

The spacing element 4 is preferably porous, to receive a matrix material, that is, the matrix material permeates interstices or voids in the spacing element, when the annular reinforcement 1 is embedded in a matrix material.

Also within the scope of the invention is to employ a spacing element 4 that is removable from between the inner and outer reinforcement bands 2 and 3, after the spacing element 4 has achieved its function of maintaining the relative alignment of the reinforcement bands 2 and 3. The removable spacing element 4 may be non-porous.

The annular reinforcement band 1 of the present invention is assembled by compressing the spacing element 4 against a first reinforcement band, thereby allowing the second reinforcement band to be slid in an axial direction past the spacing element 4 and placing the two reinforcement bands in a concentric relationship. The spacing element 4 is compressed using a jig, which is dimensioned to maintain compression, without causing interference when the second reinforcement band is slid into place.

The method of assembling the annular reinforcement structure 1 of the present invention is primarily described using the example of the spacing element first compressed against the inside face of the outer reinforcement band 3. It can be understood, however, that the first reinforcement band may be the outer reinforcement band 3 or the inner reinforcement band 2. If necessary to maintain the shape of the reinforcement band during the assembly steps, a suitable form or die may be employed inside the inner reinforcement band 2 or outside the outer reinforcement band 3.

Another advantage of the present invention is that it allows the spacing element 4 to be compressed radially without significant distortion or stretching of the spacing element 4 in a circumferential dimension, which may cause thin and thick regions around the circumference.

The jig compresses the resilient spacing element 4 against the inside face of the outer reinforcement band 3, adjacent the top edge of the reinforcement band 3, thereby creating sufficient space for the inner reinforcement band 2 to slide past the jig and the spacing element 4. Thus, the inner reinforcement band 2 may be inserted into the annular reinforcement structure, with little or no inward deflection of the inner reinforcement band 2. The invention is particularly useful in conjunction with an inner reinforcement band 2 constructed from a cord that has been wound into a helix, such as a monofilament or multifilament steel cord.

The jig may be an annular band having a circumference that is less than the circumference of the outer reinforcement band 3 and greater than a circumference of the inner reinforcement band 2. When the spacing element 4 is compressed by the jig against the inside face of the outer reinforcement band 3, the inside face of the jig has a greater circumference than the inner reinforcement band 2, thereby allowing the inside reinforcement band 2 to slide by the jig, unobstructed. In other words, the combined radial thickness of the jig and the compressed spacing element 4 is less than the radial distance between the inner and outer reinforcement bands 2 and 3, when such reinforcement bands are concentric.

Figure 4:
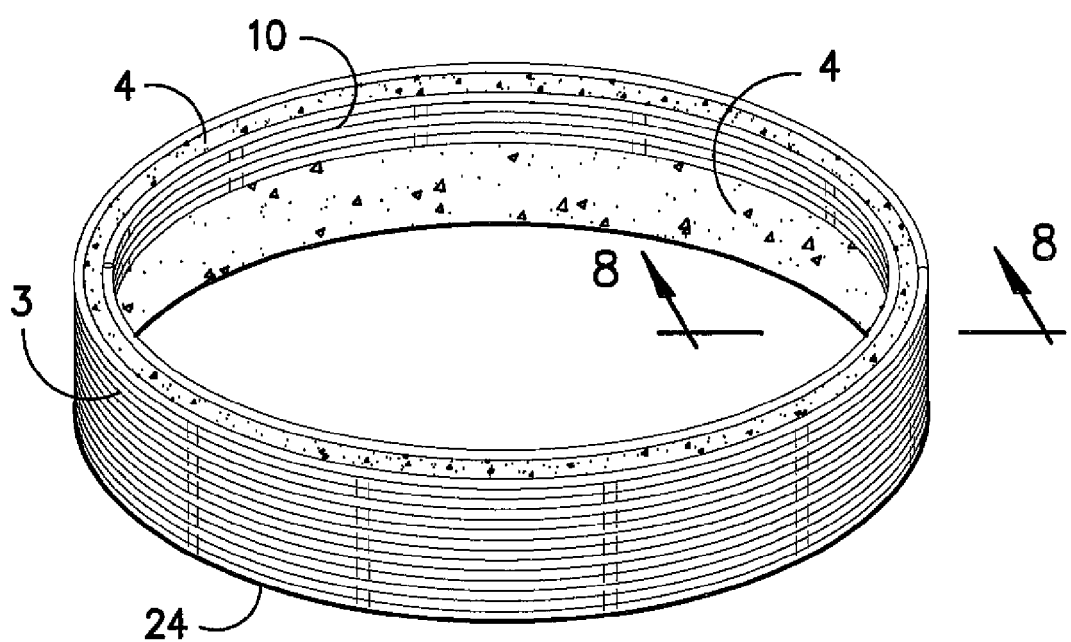
FIG. 4 is a top perspective view of the assembled jig, spacing element, and outer reinforcement band of FIG. 3.

Referring to FIGS. 3-4, jig 10 may be constructed from a cord 11 that has been wound into a helix, such as a monofilament or multifilament steel cord, which may be brass-plated. Ribs 12 are spaced around the circumference of jig 10 and arranged perpendicular to cords 11. The ribs 12 engage and maintain the orientation of the cords 11 in the form of an annular band. The jig 10 is sufficiently flexible to bend inward, thereby facilitating insertion inside the circumference of the outer reinforcement band 3, yet is also sufficiently spring-like to exert compressive force against the spacing element 4, to create an opening to slide the inner reinforcement band 2 into the structure. The jig 10 may be produced on a coil-winding machine.

FIG. 3 shows an exploded view of jig 10, spacing element 4 and outer reinforcement band 3. The outer reinforcement band 3 has an inside face 13 and ribs 14. The assembled jig 10, spacing element 4, and outer reinforcement band 3 is shown in FIG. 4.

Figure 5:
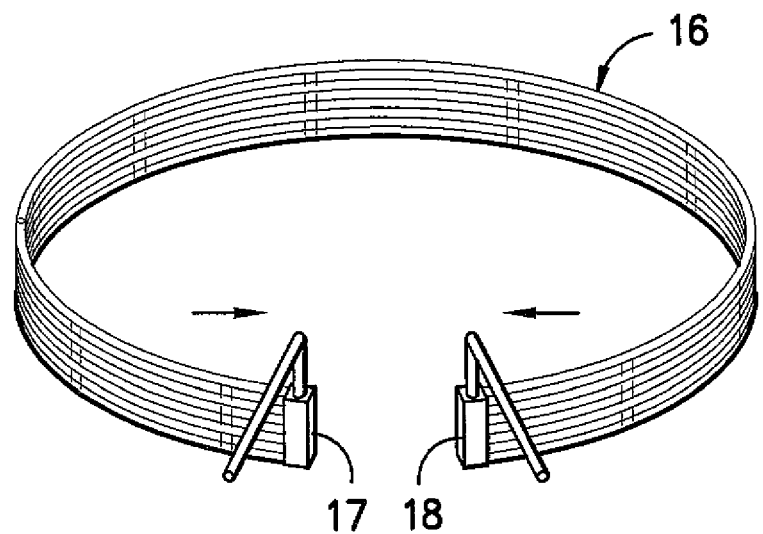
FIG. 5 is a top perspective view of an exemplary embodiment of an annular-shaped jig.

Referring to FIG. 5, jig 16 may be a strip of material formed into a ring, with the loose ends 17 and 18 abutting each other or in close proximity, which allows the circumference of jig 16 to be easily decreased and expanded, for insertion and compression of the spacing element 4, respectively. Jig 16 is believed to be useful for mass production of the annular reinforcement structure. The design and implementation of automated machinery for inserting the jig, compressing the spacing element, and removing the jig after the inner reinforcement band 2 is inserted into the structure would be known to those skilled in the art of robotics using the teachings disclosed herein. The machinery design should accommodate clearance for the insertion of the inner reinforcement band 2.

Referring to FIG. 6, a jig is constructed as discrete clamps 19 for compressing a spacing element made up of a plurality of shims 20, which are spaced around the circumference of the outer reinforcement band 3. The jig may be constructed of plate 21 and backing 22, joined together by bracket 23, set at the desired distance to compress the spacing element and create the clearance for inserting the inner reinforcement band 2. Clamps 19 may be arcuate shaped, to conform to the curve of the outer reinforcement band 3. The function of the clamps can be automated for mass production of the annular reinforcement structure, for example with robotic machinery, without interfering with or requiring deflection of the inner reinforcement band 2, when the inner reinforcement band 2 is inserted.

Figure 8:
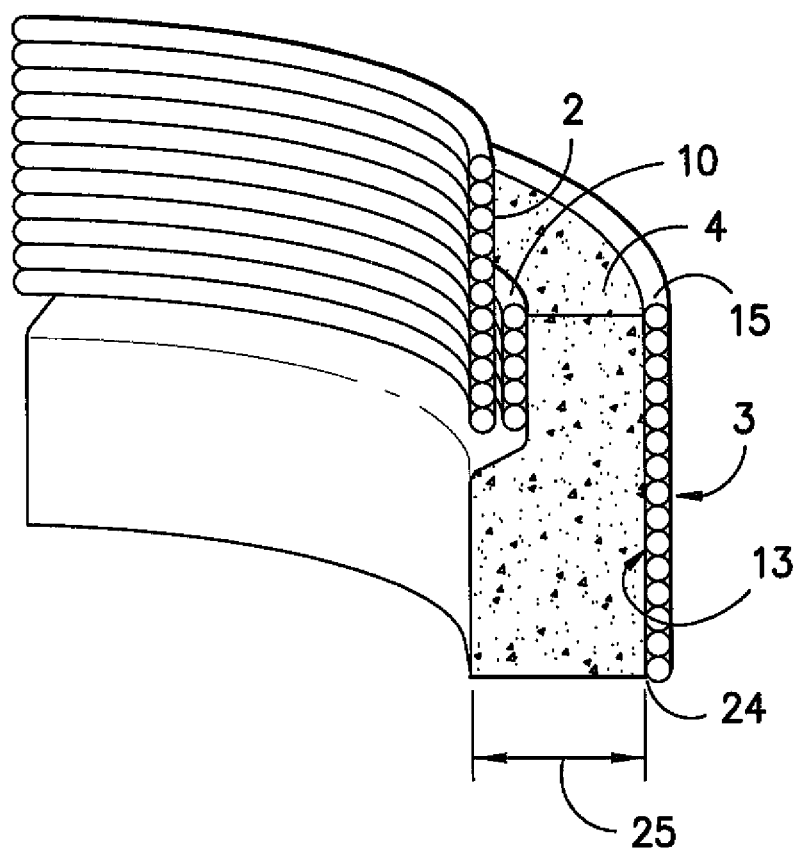
FIG. 8 is a side cross-sectional view of the inner reinforcement band being inserted into the structure shown in FIG. 4.

In one embodiment of the invention, the jig compresses the spacing element 4 adjacent the top edge of the outer reinforcement band 3, but the jig does not extend downward, in the axial direction A (FIG. 6), as far as the bottom edge of the outer reinforcement band 3. Nevertheless, the spacing element 4 may extend in an axial direction from the top of the outer reinforcement band below the jig, and optionally, as far as the bottom edge of the outer reinforcement band 3. In other words, the spacing element 4 may be compressed by the jig adjacent the top edge of the outer reinforcement band 3 only, with the portion of the spacing element 4 extending below the jig remaining in its uncompressed state. Referring to FIG. 4, the axial width of jig 10 is less than the axial widths of spacing element 4 and outer reinforcement band 3, and spacing element 4 extends as far as the bottom edge 24 of the outer reinforcement band 3. Additionally, as shown in FIG. 8, the radial thickness 25 of spacing element 4 is slightly greater than the radial distance between the inner and outer reinforcement bands 2 and 3. FIG. 6 shows an example where the axial widths of clamps 19 are less than the axial widths of spacing elements 20 and outer reinforcement band 3.

Figure 7:
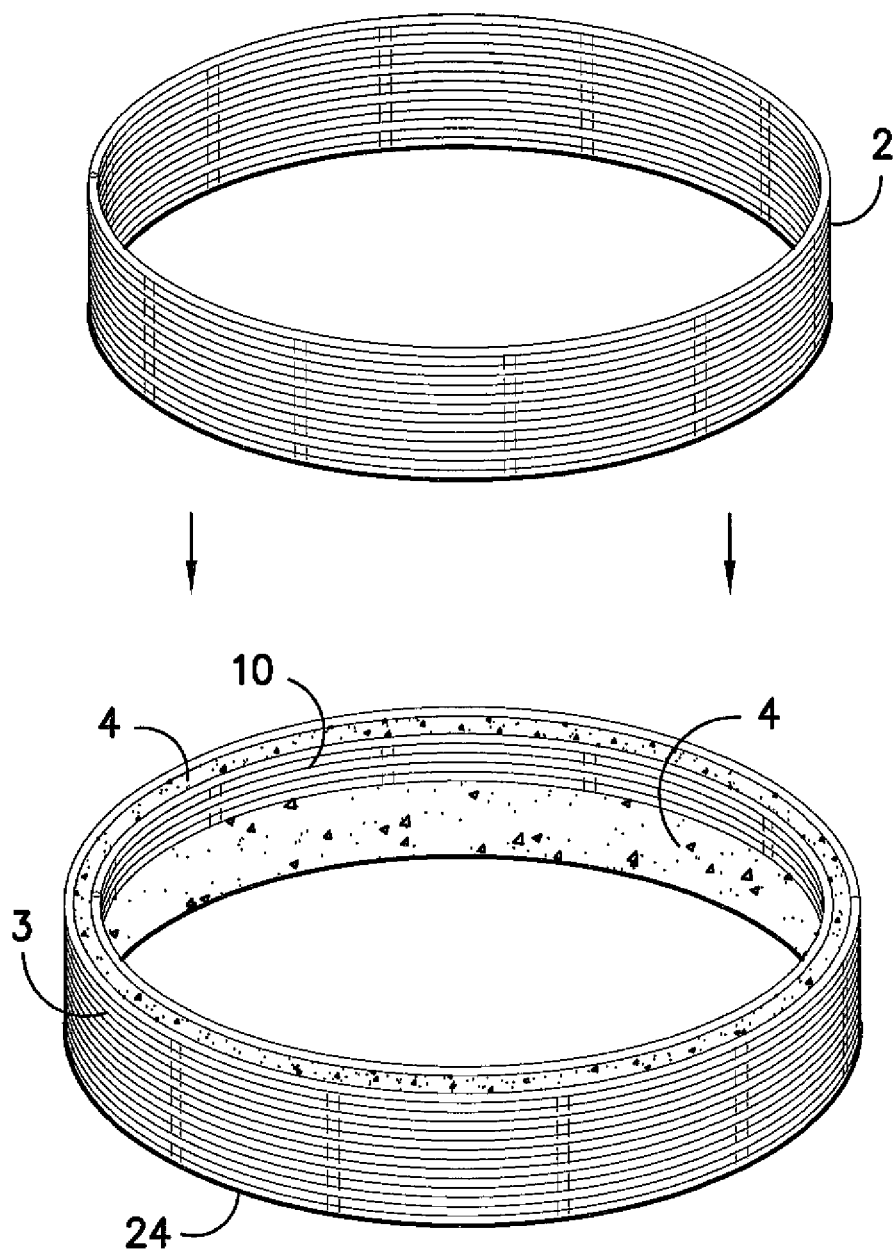
FIG. 7 is an exploded view showing the inner reinforcement band being inserted into the structure shown in FIG. 4.

Referring to FIGS. 7 and 8, inner reinforcement band 2 is inserted into the assembly of jig 10, spacing element 4, and outer reinforcement band 3 (the assembly is shown in FIG. 4). The inner reinforcement band 2 slides past jig 10 and slides against the uncompressed portion of spacing element 4. Thus, the inner reinforcement band 2 frictionally engages the spacing element 4, which maintains the spacing element 4 in the desired orientation between the inner and outer reinforcement bands 2 and 3 when the jig 10 is removed.

Referring to FIG. 8, a side cross sectional view of the assembly of FIG. 4 shows how jig 10 compresses spacing element 4 against the inside face 13 of outer reinforcement band 3. The compression of spacing element 4 occurs adjacent the top 15 of outer reinforcement band 3, thereby allowing inner reinforcement band 2 to be inserted into the assembly, without bending or distortion. While annular jig 10 is shown in combination with an annular spacing element 4, it can be understood that an annular-shaped jig 10 can also be used to compress a spacing element comprising a plurality of discrete shims 20.

Referring to FIGS. 9-15, a spacing element insertion machine 30 and its operation is illustrated. Insertion machine 30 has base 31, which supports plates 32, spaced around the circumference of base 31. Plates 32 have an arcuate shape, whereby convex side 33 is designed to engage and uniformly compress the spacing element 4 against the inside face of the outer reinforcement band 3. The radii of the arcuate plates 32 may be selected so that plates 32 represent the arcs of a circle, when the plates are extended to compress the spacing element 4, prior to insertion of the inner reinforcement band 2.

Figure 9:
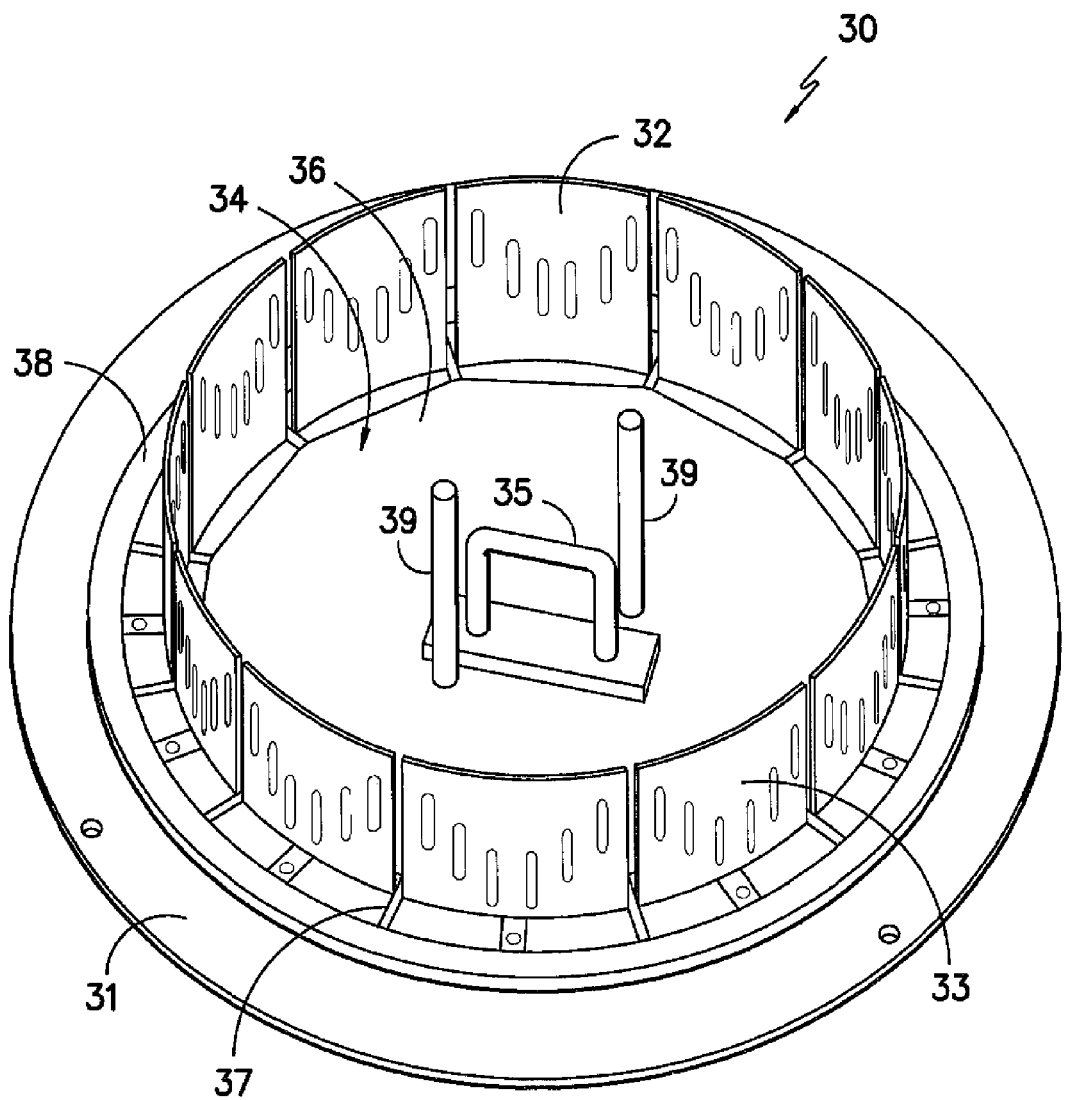
FIG. 9 is a top perspective view of an exemplary embodiment of a machine for assembling an annular reinforcement structure.
Figure 14:
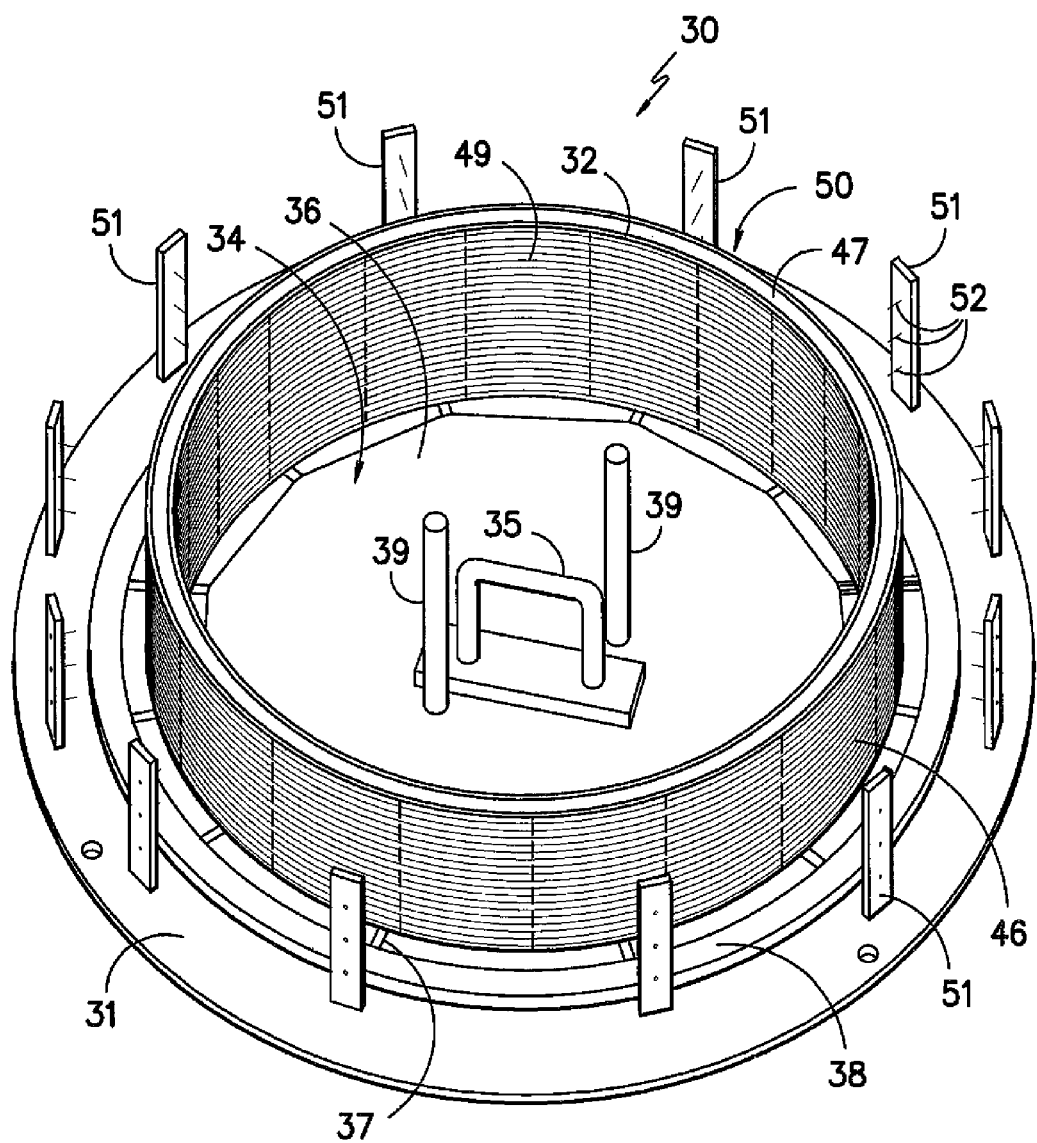
FIG. 14 is an exploded, top perspective view illustrating the pin plates used to distribute force axially when the annular reinforcement structure is removed from the insertion machine.

FIG. 9 shows removable frame 34, which is temporarily supported by base 31, but can be lifted upward relative to base 31 and plates 32, by pulling handle 35. Frame 34 has hub 36 and spokes 37, which extend between gaps in plates 32. Rim 38 connects spokes 37. Holes are provided in hub 36, allowing frame 34 to slide along guides 39, for example, when the assembled annular reinforcement structure 1 is lifted off of insertion machine 30, as shown in FIG. 14.

Figure 10:
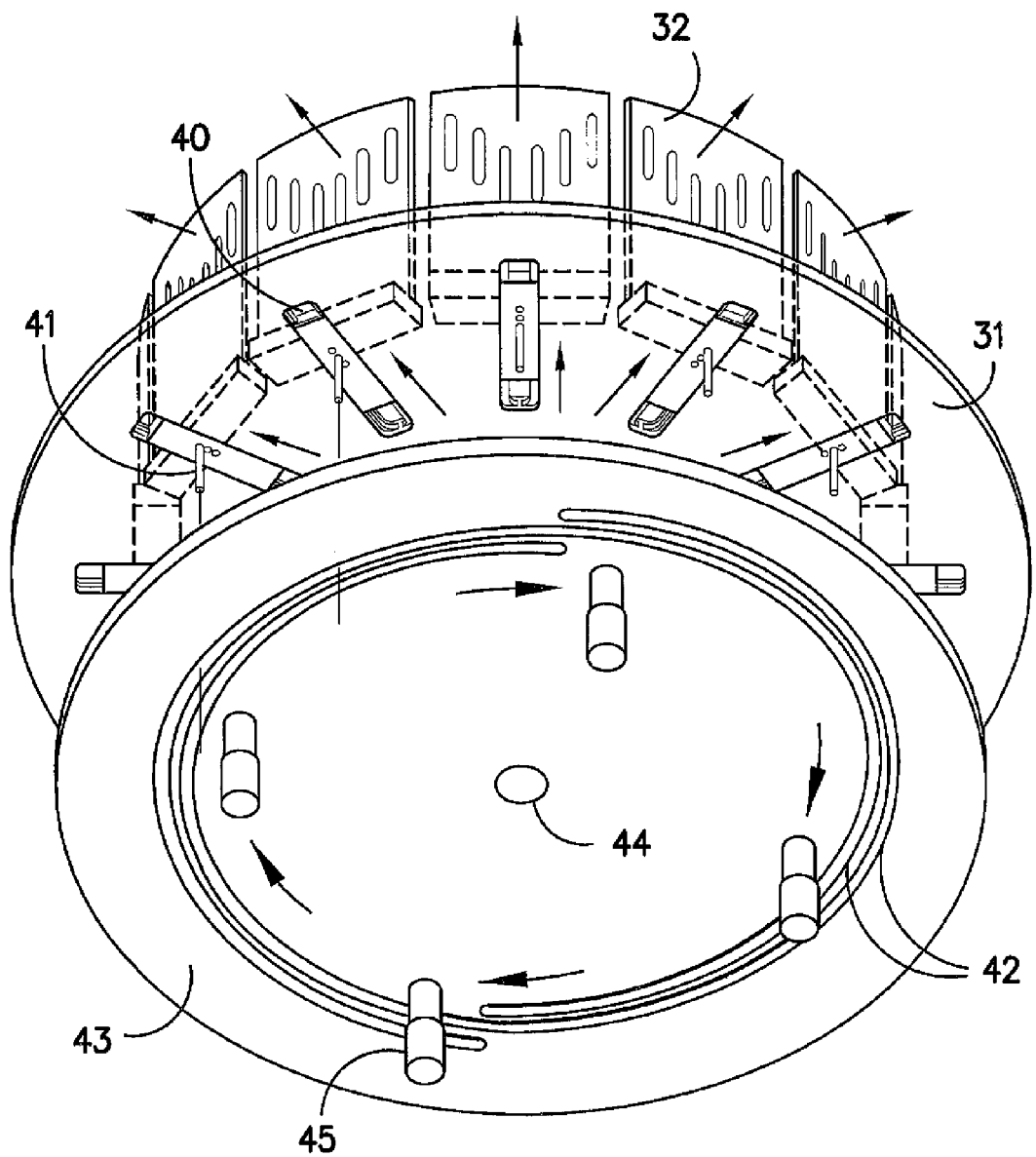
FIG. 10 is an exploded, bottom perspective view of the insertion machine for assembling the annular reinforcement structure of FIG. 9 showing an exemplary mechanism for retracting and extending the plates.

Referring to FIG. 10, the mechanism for retracting and extending plates 32 in a radial direction is shown. Plates 32 slides radially in corresponding tracks 40, which are supported by base 31. Tracks 40 may be integrally formed in base 31 as shown in FIG. 10, for example by cutting slots in base 31, or may be affixed to the surface of base 31, or may be some combination thereof. Tracks 40 are configured to allow radial movement of plates 32 outward from the center of base 31, while maintaining plates 32 in alignment relative to the outer reinforcement band 3, so that uniform pressure is applied to the spacing element 4 during the compression step. In one example, each of the lower portion of plates 32 and tracks 40 may be provided with corresponding tongue and groove features, which prevent plates 32 from tilting during operation.

The bottom portions of each of plates 32 have pins 41 extending downward, past the underside of base 31. Pins 41 engage one of spiral grooves 42 in actuation disk 43, which can be rotated on spindle 44, affixed to base 31. Actuation disk 43 can be rotated by turning arms 45, as shown by arrows, or the movement can be automated by any of a variety of mechanisms, such as by an axle affixed to the actuation disk 43 or a combination of teeth on the outer circumference of actuation disk 43 and gears engaging the teeth.

In one embodiment of the invention, spiral grooves 42 are not cut completely through actuation disk 43, and the lower tips of pins 41 are each provided with a small ball bearing, which rides in spiral grooves 42.

Figure 11:
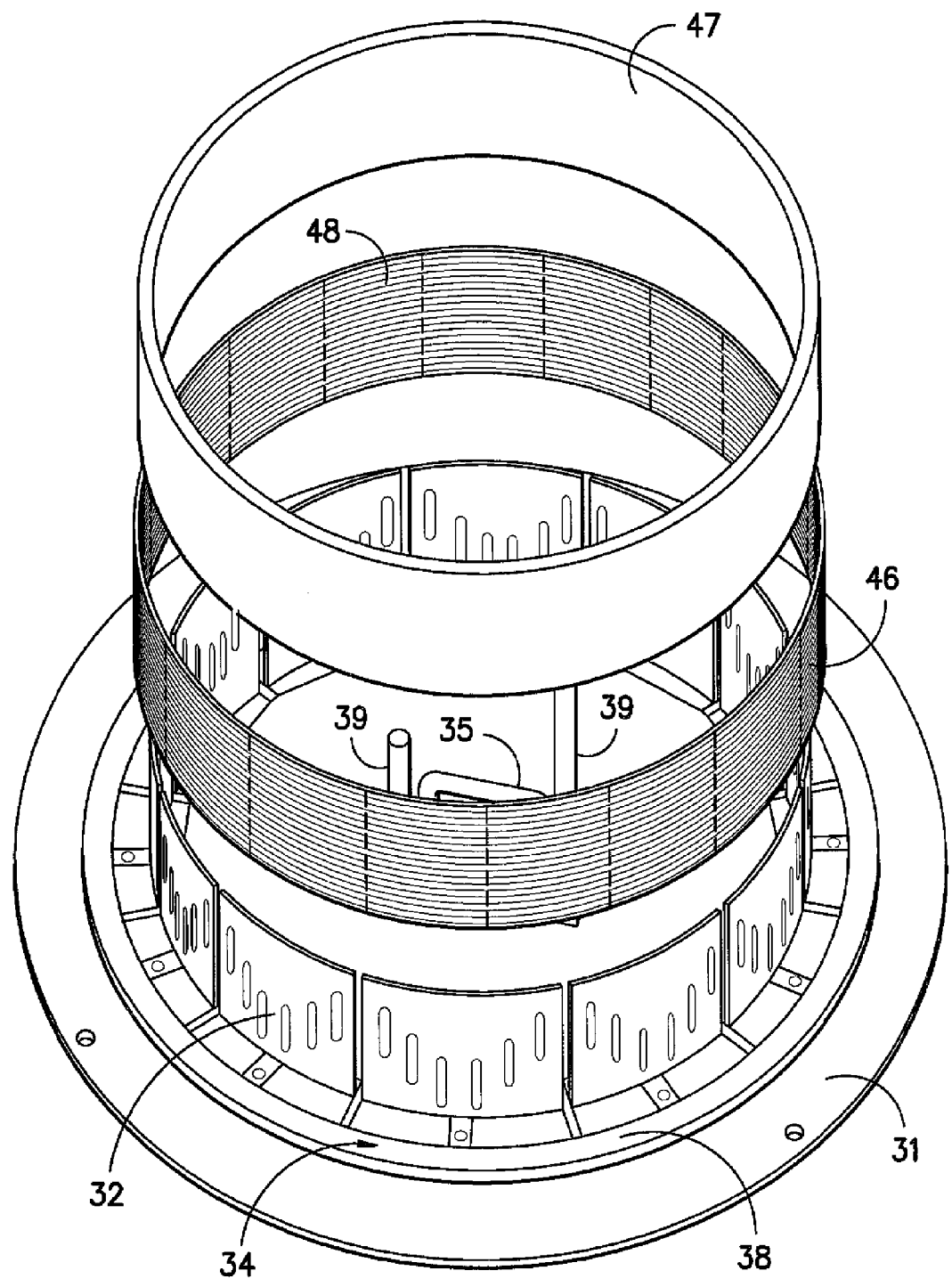
FIG. 11 is an exploded, top perspective view of the spacing element and outer reinforcement band being placed on the insertion machine of FIG. 9.
Figure 12:
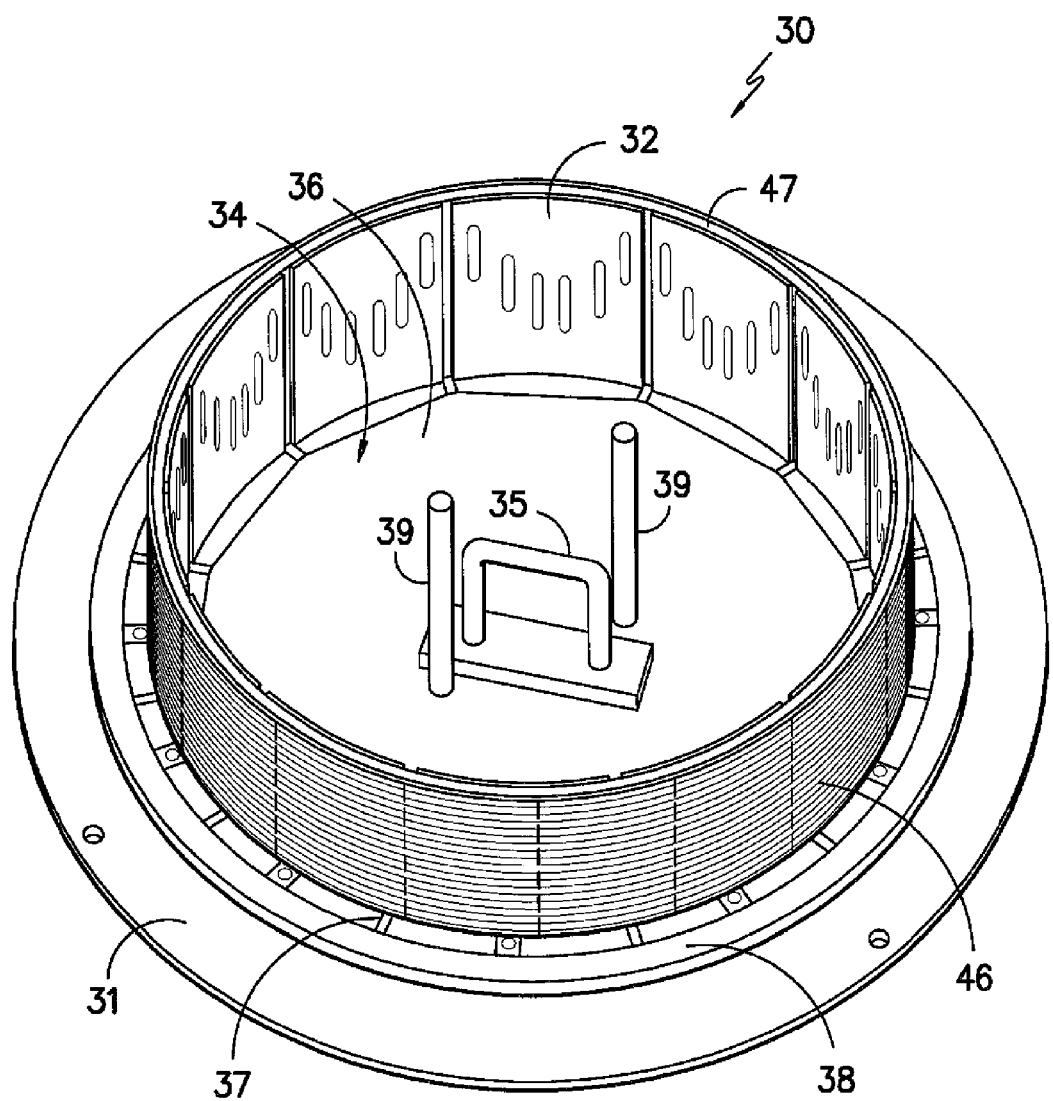
FIG. 12 is a top perspective view of a spacing element and an outer reinforcement band in place on the insertion machine of FIG. 9.

Referring to FIGS. 11 and 12, an outer reinforcement band 46 and a spacing element 47 are placed around plates 32, while plates 32 are in their retracted position, that is, drawn inward to the center of base 31. In one embodiment of the invention, spacing element 47 is placed against the inside face 48 of reinforcement band 46, before the outer reinforcement band 46 and the spacing element 47 are positioned on insertion machine 30. As shown in FIG. 12, outer reinforcement band 46 and spacing element 47 are placed on frame 34, which is supported on base 31.

Figure 13:
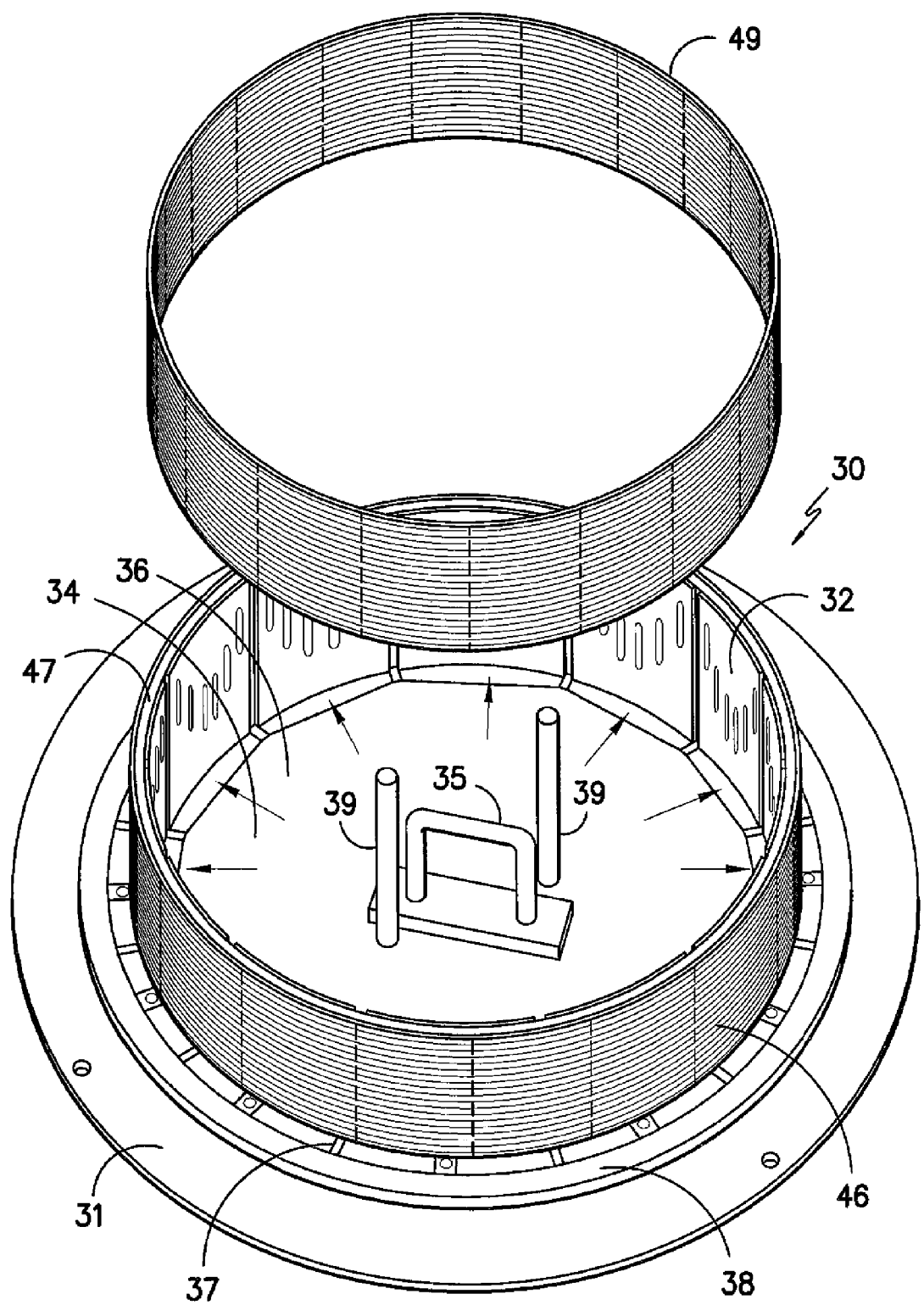
FIG. 13 is an exploded, top perspective view of the plates extended to compress the spacing element to allow insertion of the inner reinforcement band.

Next, plates 32 are extended radially outward by rotating actuation disk 43 to compress spacing element 47 against the inside face 48 of outer reinforcement band 46, prior to insertion of inner reinforcement band 49, as shown in FIG. 13. Thus, it is possible to assemble the annular reinforcement structure 50, shown in FIG. 14, without kinking or otherwise causing the circumference of inner reinforcement band 49 to be temporarily reduced to fit within the spacing element.

Figure 15:
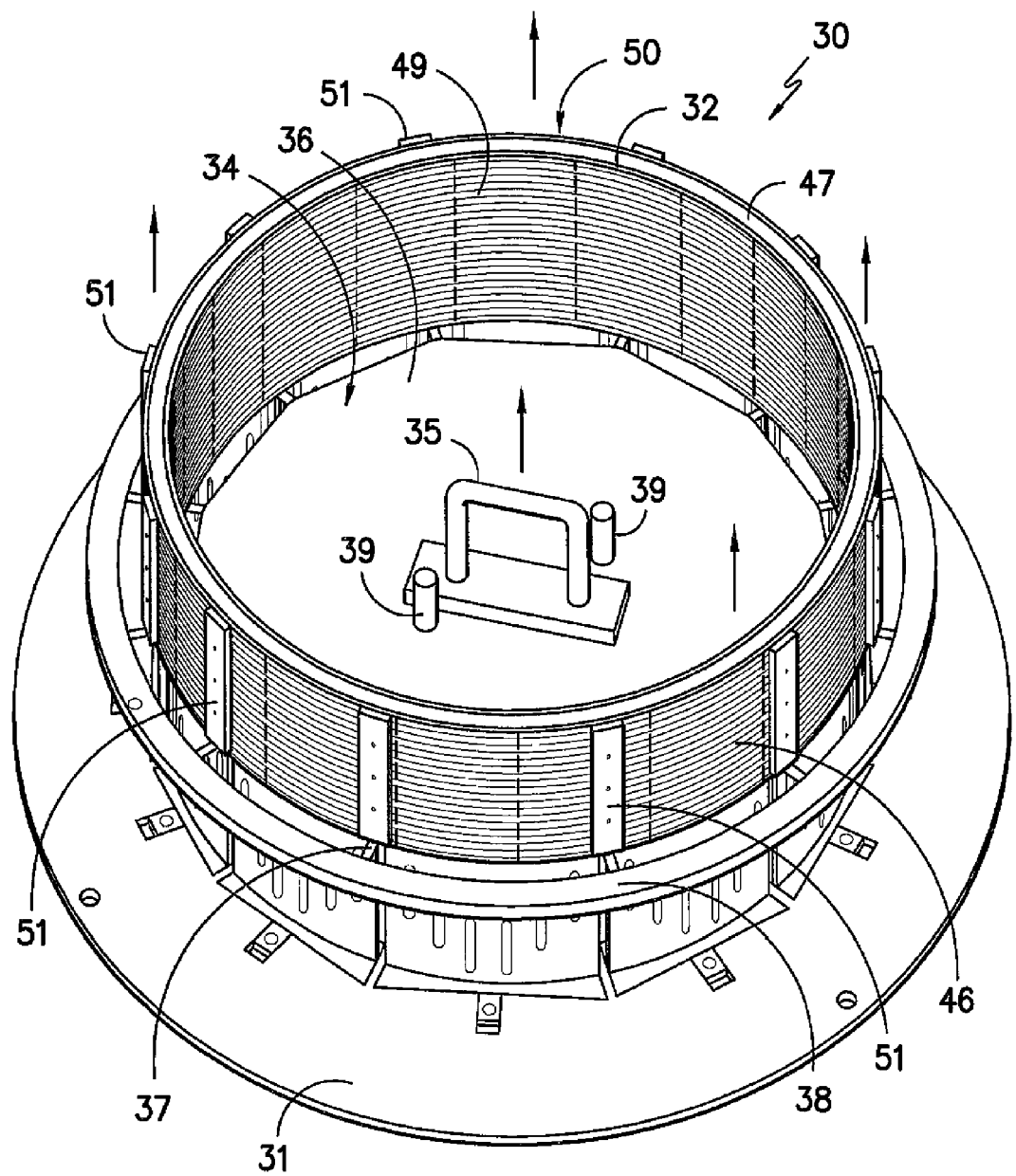
FIG. 15 is a top perspective view showing the annular reinforcement structure being removed from the insertion machine.

Referring to FIGS. 14 and 15, the process of separating annular reinforcement structure 50 from insertion machine 30 may be facilitated by employing pin plates 51, each having an array of pins 52 distributed along their length. Pins 52 penetrate outer reinforcement band 46, spacing element 47 and inner reinforcement band 49. The bottom of pin plates 51 rest on spokes 37 of frame 34. Thus, pins 52 are spaced both axially and circumferentially around annular reinforcement structure 50.

Annular reinforcement structure 50 is separated from insertion machine 30 by lifting on handle 35 to raise frame 34, with spacing element 47 retained between the outer reinforcement band 46 and the inner reinforcement band 49. Force is distributed to annular reinforcement structure 50 by frame 34, pin plates 51, and pins 52. Accordingly, when annular reinforcement structure 50 and insertion machine 30 are separated, the force is distributed evenly, rather than acting only on the bottom edge of annular reinforcement structure 50.

Prior to lifting frame 34, plates 32 may be partially retracted, thereby decreasing the frictional resistance between the convex side 33 of plates 32 and spacing element 47. Plates 32 may be provided with a coating, such as polytetrafluoroethylene, to reduce friction.

In the method of placing a resilient spacing element against the inside face of the outer reinforcement band and compressing the spacing element with a jig, no particular order of assembly is required. For example, the spacing element may be inserted against the inside face of the outer reinforcement band first, and the jig inserted against the spacing element second. Alternatively, the jig may be inserted within the outer reinforcement band first, and the spacing element inserted between the jig and the inside face of the reinforcement band second, such as by deflecting the jig radially inward to accommodate the spacing element.

The method of making the annular reinforcement structure disclosed herein for two reinforcement bands and a spacing element could be repeated with a third reinforcement band and second spacing element, to produce an annular reinforcement structure having three reinforcement bands, with each band separated by a spacing element. For example, employing the methods and apparatus disclosed herein, it is possible to first assemble an outer reinforcement band and an intermediate reinforcement band with a spacing element interposed between, followed by assembly of the inner reinforcement band with a second spacing element between the inner reinforcement band and the intermediate reinforcement band.

The annular reinforcement structure of the present invention may be used to reinforce a matrix material. For example, the exemplary embodiments of an annular reinforcement structure 1 or 50 may be covered with the matrix material, that is, the matrix material covers at least one surface of the reinforcement structure, for example, the outside face of the outer reinforcement band 3. The annular reinforcement structure may be embedded in the matrix material. It is also within the scope of the invention for the spacing element to be porous and the matrix material to permeate the pores, followed by curing the matrix material. In still another embodiment of the invention, a first matrix material may be introduced into the space between the inner and outer reinforcement bands, and a second matrix material may be used to cover the surface of or embed the annular reinforcement structure.

Figure 16:
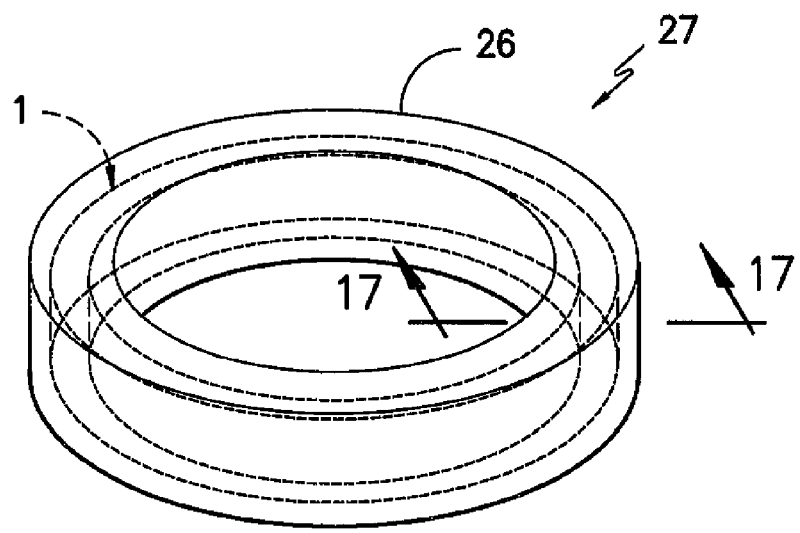
FIG. 16 is a top perspective view of an exemplary embodiment of an annular reinforcement structure embedded in a matrix material.
Figure 17:
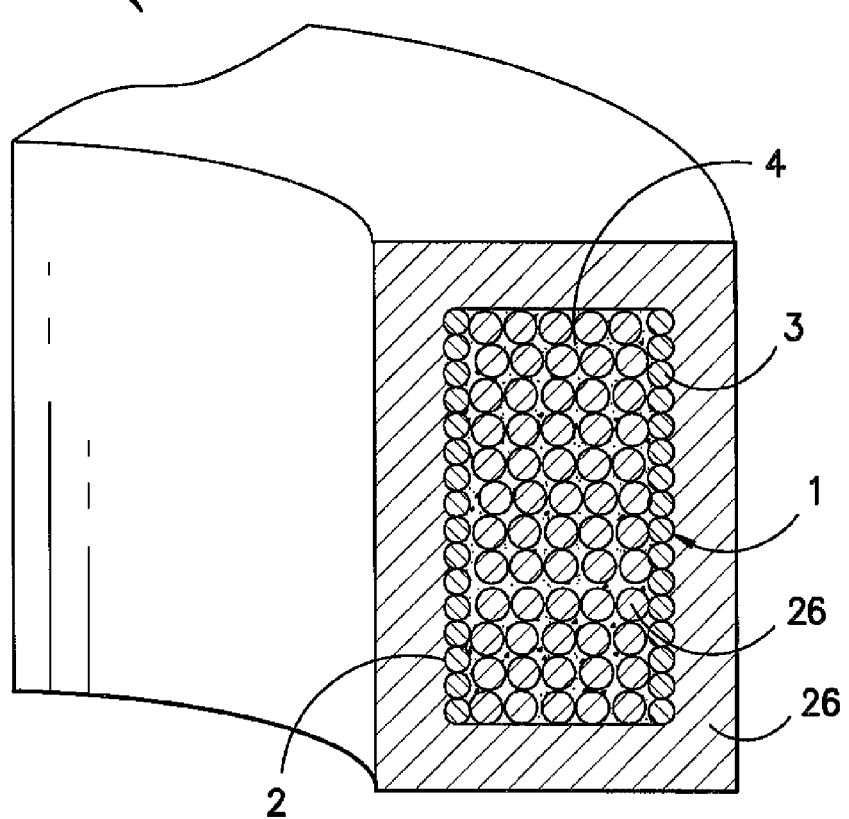
FIG. 17 is a side cross-sectional view of an exemplary embodiment of an annular reinforcement structure embedded in a matrix material.

Referring to FIGS. 16 and 17, the annular reinforcement structure 1 is shown embedded in a matrix material 26, to create reinforced ring 27. Depending on the selection of the matrix material, whether the spacing element is porous, such as an open-cell polymer foam, and the processing conditions, the matrix material may or may not permeate the spacing element. In the embodiment of the invention shown in FIG. 16, the matrix material has permeated the open-cell spacing element 4 and the voids in the polymer foam are filled with matrix material 26.

The matrix material may be selected from a wide range of organic and inorganic materials, especially those that may be cast with the annular reinforcement structure embedded therein. By way of example, the matrix material may be a natural or synthetic polymer, including thermoplastic and thermosetting materials. Of particular interest are elastomeric matrix materials, such as natural or synthetic rubber, polyurethane, segmented copolyester, polyamide co-polymer and thermoplastic elastomers. In one embodiment of the invention, spacing element 4 is a reticulated, polyurethane foam and the matrix material 26 is a polyurethane polymer formed without a blowing agent, that is, substantially without voids, which permeates the voids in the polyurethane foam. In another example, the matrix material is a ceramic, concrete or organometallic compound.

Also within the scope of the present invention are processes in which the spacing element is a polymer foam, and the polymer is a relatively low melting temperature thermoplastic and is partially or completely melted during the process of embedding the annular reinforcement structure in a matrix material. For example, a thermoplastic polymer foam spacer could be melted by the introduction of a matrix material, either because the matrix material is heated or involves an exothermic reaction. Alternatively, the polymer foam spacer could be melted or dissolved, prior to introduction of the matrix material, after the spacer has served its function of maintaining the relative orientation of the inner and outer reinforcement bands.

Figure 18:
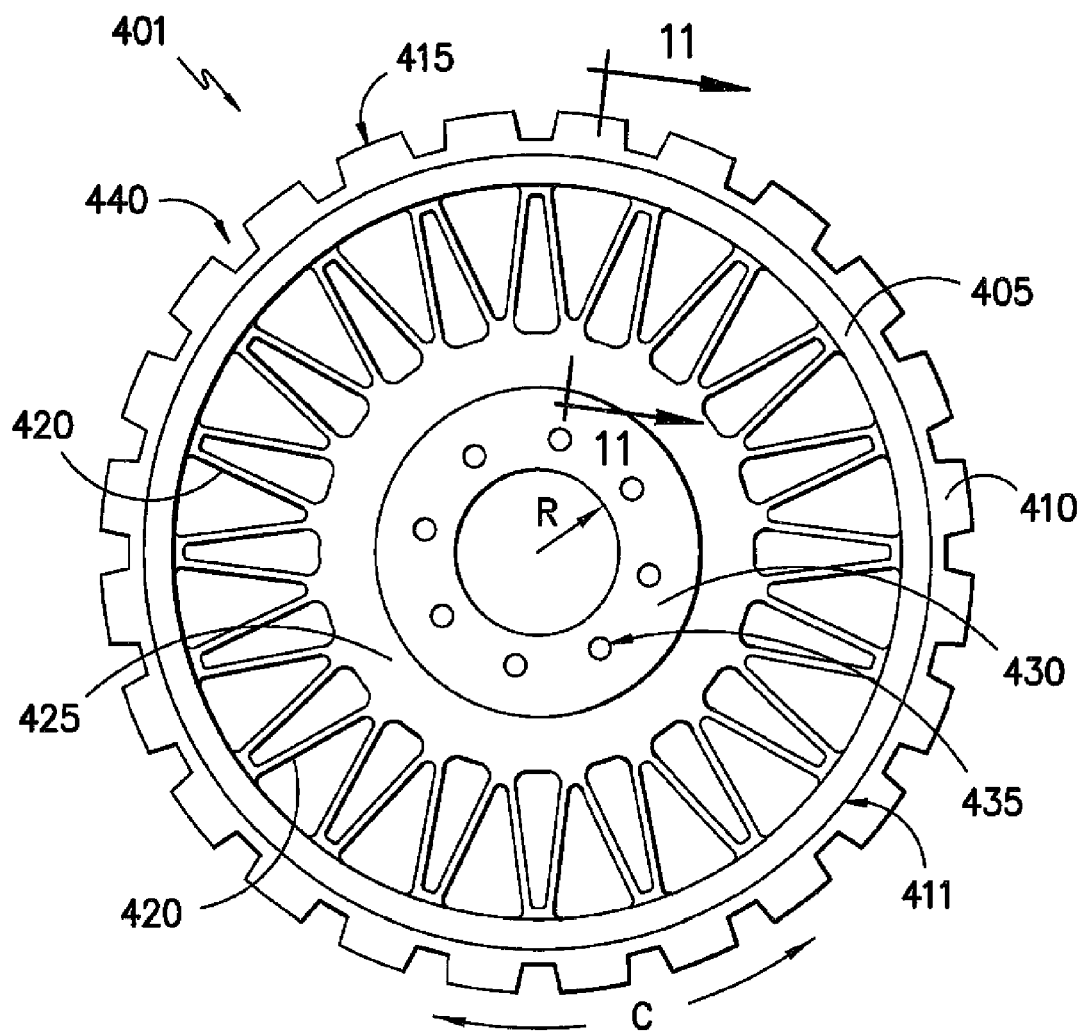
FIG. 18 is a perspective view of an exemplary embodiment of a non-pneumatic wheel of the present invention.
Figure 19:
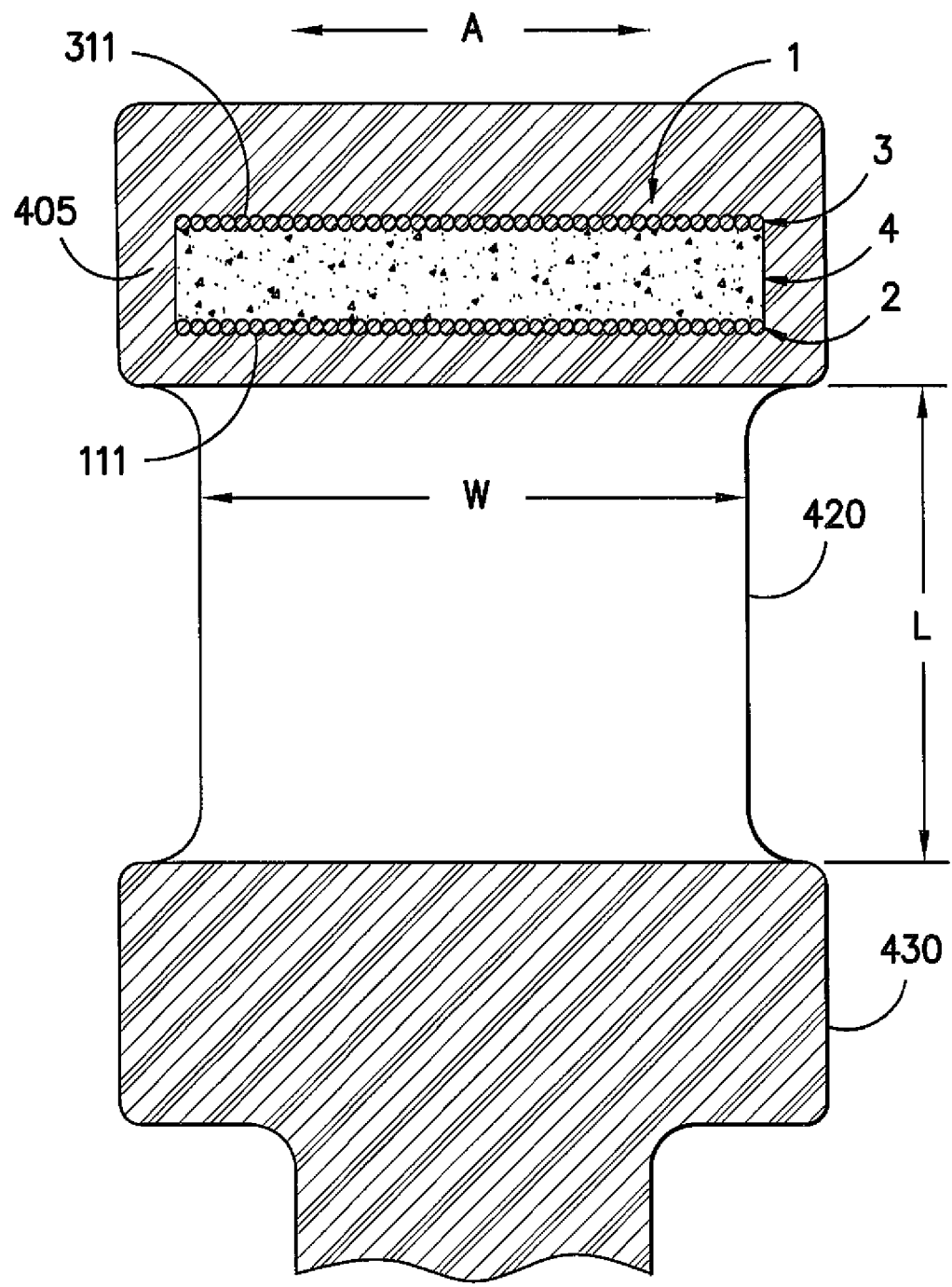
FIG. 19 is a partial, cross-sectional view of the exemplary embodiment of FIG. 18, taken along line 11-11, and incorporating an exemplary annular reinforcement structure such as that shown in FIG. 1.

Embodiments of the annular reinforcement such as e.g., annular reinforcements 1, 27, and 50 may be used to create a non-pneumatic wheel or tire. FIG. 18 provides a perspective view of an exemplary embodiment of a structurally supported wheel 401 in accordance with the present invention. As used herein, structurally supported means that the tire carries a load by its structural components without the support of a gas inflation pressure. FIG. 19 provides a partial, cross-sectional view of wheel 401 taken along line 19-19 as shown in FIG. 10. Arrows C denote the circumferential direction. Arrow R denotes the radial direction. Arrows A denotes axial direction, also referred to sometimes as the transverse or lateral direction.

Referring now more particularly to FIG. 18, annular reinforcement structure 1 is positioned within a band 405 extending about circumferential direction C. For this exemplary embodiment, annular reinforcement structure 1 is constructed as previously described. In addition, other constructions such as e.g., annular reinforcement structure 27, 50 or constructions having multiple spacers may be used as previously indicated. For wheel 401, bands 2 and 3 provide e.g., vertical stiffness for wheel 401 while polymer foam spacer 4 assists in providing for a shear layer for wheel 401 as will be further described.

In accordance with the invention, wheel 401 is useful in applications where the traction, steering, or suspension qualities of a pneumatic tire are advantageous or in need of improvement. A structurally supported wheel 401 constructed in accordance with the present invention as more fully described below can offer improved compliance and stiffness characteristics, in a wheel requiring less maintenance than a pneumatic tire. In addition to use on motor vehicles, such a wheel could also be advantageously used, for example, on a wheel chair, a gurney, a hospital bed, a cart for sensitive equipment, or other vehicles or conveyances where sensitivity to shock is important. In addition, the wheel may be used in place of casters for chairs or other furniture, or as wheels for baby carriages, skate boards, in-line skates, etc. Wheel 401 of the invention could be used in machines or apparatuses where load bearing or load applying wheels are used. The term "vehicle" is used below for the purposes of the description; however, any device on which compliant wheels could be mounted is included in the following description and "vehicle" should be understood to include the same.

Wheel 401 as shown in FIGS. 18 and 19 has an annular band 405 and a plurality of tension transmitting elements, illustrated as web spokes 420, extending transversely across and inward from band 405, to a mounting band 425 at the radially inner end of the web spokes 420. Mounting band 425 anchors wheel 401 to a hub 430 with holes 435 for mounting. A tread portion 410 is formed at the outer periphery of band 405. Tread portion 410 may be an additional layer bonded on the band 405 as shown in FIG. 18, for example, so as to provide different traction and wear properties than the material used to construct band 405. Alternatively, tread portion 410 may be formed as part of the outer surface of the compliant band 405. Tread features may be formed in the tread portion 410 and may include blocks 415 and grooves 440.

As mentioned, web spokes 420 in the exemplary embodiment of FIGS. 18 and 19 extend transversely across wheel 401, which as used herein means that the web spokes 420 extend from side to side of wheel 401 and may be aligned with the axis of rotation, or may be oblique to the wheel axis. Further, "extending inward" means that web spokes 420 extend between band 405 and mounting band 425, and may lie in a plane radial to the wheel axis or may be oblique to the radial plane. In addition, as shown in FIG. 18, web spokes 420 may actually include spokes at different angles to the radial plane. Various shapes and patterns may be used as shown, e.g., in U.S. Pat. No. 7,013,939.

Band 405 supports the load on wheel 401 and resiliently deforms to conform to the road (or other supporting surface) to provide traction and handling capabilities. More particularly, as described in U.S. Pat. No. 7,013,939, when a load is placed on the wheel 401 through hub 430, band 405 acts compliantly in that it bends and otherwise deforms for ground contact and forms a contact patch, which is the portion of wheel 401 that is in contact with the ground under such load. The portion of band 405 that is not in ground contact acts in a manner similar to an arch and provides a circumferential compression stiffness and a longitudinal bending stiffness in the equatorial plane sufficiently high to act as a load-supporting member. As used herein, "equatorial plane" means a plane that passes perpendicular to the wheel axis of rotation and bisects the wheel structure.

The load on the wheel 401, transmitted from the vehicle (not shown) to hub 430 essentially hangs by web spokes 420 attached to the load supporting portion of band 405. Web spokes 420 in the ground contacting region do not experience tensile loading due to the load. As wheel 401 rotates, of course, the specific portion of the compliant band 405 acting as an arch continually changes, however, the concept of an arch is useful for understanding the load supporting mechanism. The amount of bending of band 405, and accordingly, the size of the contact patch is proportional to the load. The ability of band 405 to bend resiliently under the load provides a compliant ground contact area that acts similar to that of a pneumatic tire, with similar advantageous results.

For example, band 405 can envelop obstacles to provide a smoother ride. Also, band 405 is able to transmit forces to the ground or road for traction, cornering, and steering. By contrast, in typical solid and cushion tires, the load is supported by compression of the tire structure in the contact area, which includes compression of the cushion material under the rigid hub. Compliance of the cushion material is limited by the compression properties of the material and the thickness of the material on the rigid wheel or hub. Examples of non-pneumatic wheels using compliant bands can also be found in U.S. Pat. No. 6,769,465 B2 and U.S. Pat. No. 7,650,919 B2.

Still referring to FIGS. 18 and 19, web spokes 420 are substantially sheet-like elements having a length L in the radial direction, a width W in the axial direction corresponding generally to the axial width of the compliant band 405, although other widths W may be used including widths W that vary along the radial direction as shown in FIG. 19. Web spokes 420 also have a thickness (i.e. a dimension perpendicular to length L and width W) that is generally much less than either the length L or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 420 is increased, the web spokes may provide some compressive load bearing force in the ground contact area. The predominant load transmitting action of web spokes 420 as a whole, however, is in tension. The particular web spoke thickness may be selected to meet the specific requirements of the vehicle or application.

As seen in FIG. 18, preferably, web spokes 420 are oriented relative to the compliant band 405 across the axial direction A. Tension in web spokes 420 is, therefore, distributed across band 405 to support the load. By way of example, web spokes 420 may be formed of an elastomeric material having a tensile modulus of about 10 to 100 MPa. Web spokes 420 may be reinforced if desired. The material used to construct web spoke material 420 should also exhibit elastic behavior to return to original length after being strained to e.g., 30%, and to exhibit constant stress when the web spoke material is strained to e.g., 4%. Further, it is desirable to have a material with a tan δ of not more than 0.1 at the relevant operating conditions. For example, commercially available rubber or polyurethane materials can be identified which meet these requirements. By way of further example, Vibrathane B836 brand urethane from Chemtura Corporation of Middlebury, Conn. has been suitable for construction of web spoke 420.

For the exemplary embodiment of FIGS. 18 and 19, web spokes 420 are interconnected by radially inner mounting band 425, which encircles the hub 430 to mount wheel 401 to the hub 430. Depending on the construction materials and manufacturing process, hub 430, mounting band 425, annular band 405, and web spokes 420 may be molded as single unit. Alternatively, one or more of such components may be formed separately and then attached to each other through e.g., adhesives or molding. Additionally, other components may be included as well. For example, an interface band can be used to connect web spokes 420 at their radially outer ends, and then the interface band would be connected to band 405.

According to a further embodiment, web spokes 420 could be mechanically attached to hub 430, for example, by providing an enlarged portion on the inner end of each web spoke 420 that engages a slot device in hub 430, or by attaching adjacent web spokes 420 to form a loop at a hook or bar formed in hub 430.

Substantially purely tensile load support is obtained by having a web spoke 420 that has high effective stiffness in tension but very low stiffness in compression. To facilitate bending in a particular direction, web spokes 420 may be curved. Alternatively, web spokes 420 can be molded with a curvature and straightened by thermal shrinkage during cooling to provide a predisposition to bending in a particular direction.

Web spokes 420 should resist torsion between annular band 405 and hub 430, for example, when torque is applied to wheel 401. In addition, web spokes 420 should resist lateral deflection when, for example, turning or cornering. As will be understood, web spokes 420 that lie in the radial-axial plane, that is, are aligned with both the radial and axial directions, will have high resistance to axially directed forces, but, particularly if elongated in the radial direction R, may have relatively low resistance to torque in the circumferential direction C. For certain vehicles and applications, for example, those producing relatively low torque, a web spoke package having relatively short spokes 420 aligned with the radial direction R will be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial and the circumferential directions, thus adding resistance to torque, while retaining radial and lateral force-resisting components. The angle of orientation may be selected depending on the number of web spokes used and the spacing between adjacent web spokes. Other alternative arrangements may also be used.

One advantage of the compliant wheel of the invention is that the selection of the size and arrangement of band 405 and web spokes 420 allows the vertical, lateral, and torsional stiffness of the wheel to be tuned independently of the contact pressure and of each other. The operating parameters of band 405, load carrying and compliance, are determined in part by selection of materials having the circumferential compression stiffness and longitudinal bending stiffness in the equatorial plane to meet the design load requirements. These parameters are examined in view of the diameter of wheel 401, the width of annular band 405 in the axial direction A, the thickness of band 405 in radial direction R, and the length and spacing of web spokes 420. The number of web spokes is selected to maintain circularity of band 405, and will depend also on the spacing between adjacent web spokes 420.

Continuing with FIG. 19, as previously indicated, band 405 includes an annular reinforcement structure 1. Band 405 may be e.g., molded integrally as part of non-pneumatic wheel 401 or constructed separately and then attached with the other elements of wheel 401. For example, in one exemplary method of manufacturing wheel 401, an annular reinforcement structure such as e.g., structure 1 is constructed using one or methods a previously described to position spacer 4 between annular reinforcing bands 2 and 3. The resulting assembly (FIG. 4) is placed into a mold and cast as band 405, which can then be connected to other elements of wheel 401 such as web spokes 420. For examples, casting of band 405 may include placement of a matrix material into the mold that may impregnate a foam spacer 4.

Figure 20:
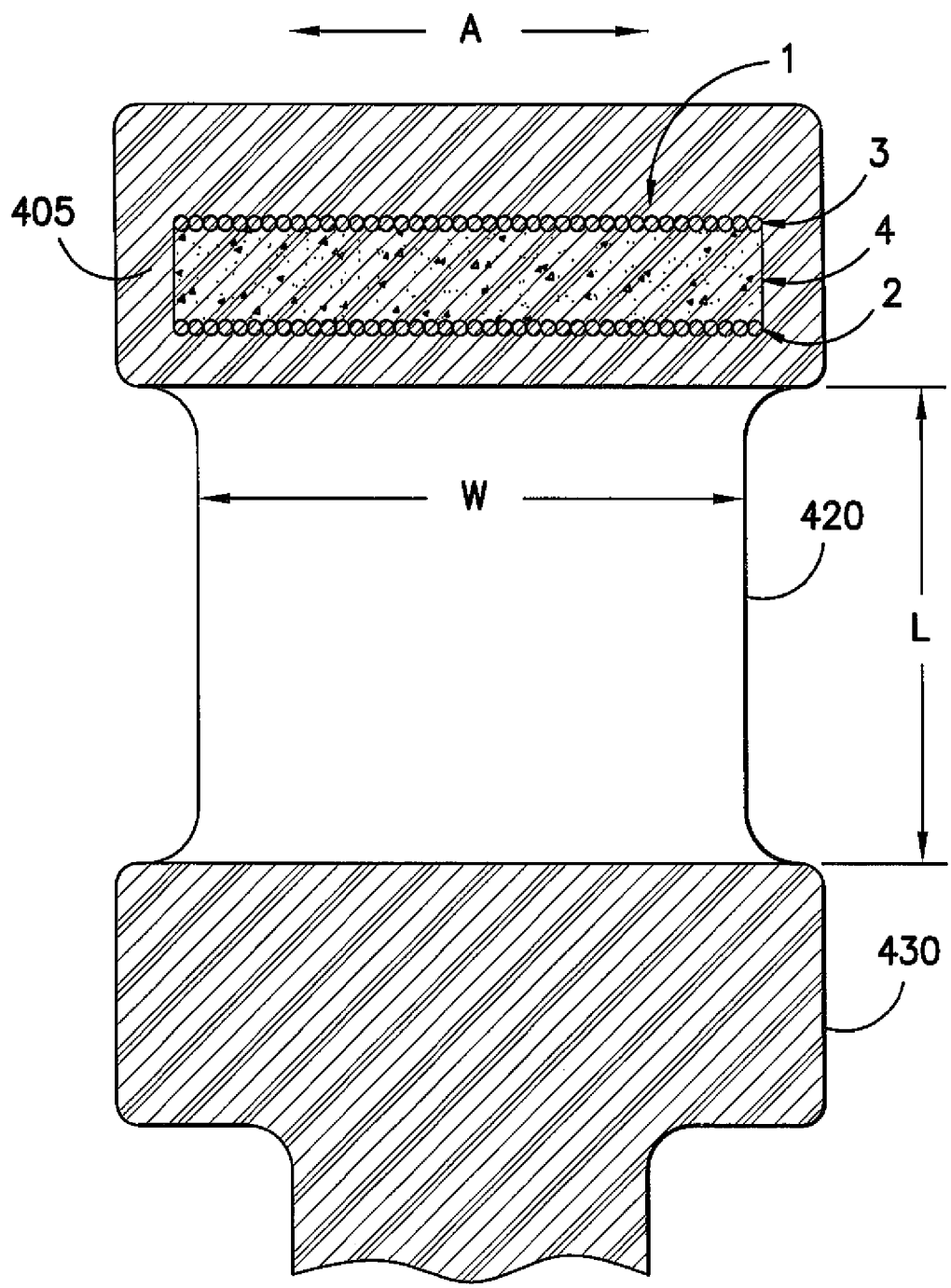
FIG. 20 is a partial, cross-sectional view of the exemplary embodiment of FIG. 18, taken along line 11-11, and incorporating another exemplary annular reinforcement structure of the present invention.

Alternatively, and by way of further example, reinforcing structure 1 may be placed into a mold and cast as wheel 401. For example, annular reinforcement 1 can be placed into a wheel mold that provides one or more cavities defining spokes 420, mounting band 425, and hub 430. Alternatively, hub 430 may be formed separately and configured for receipt of the molded mounting band 425. A matrix material is then provided into the mold to form the features (e.g., spokes, band, etc.) of a non-pneumatic wheel such as e.g., wheel 401. The matrix material may also impregnate spacer 4 and potentially annular reinforcement bands 2 and 3 as previously discussed. FIG. 19 illustrates the use of annular reinforcement band 1 where matrix material forming band 405 has not permeated into spacer 4 whereas FIG. 20 illustrates an annular reinforcement band 1 where the matrix material has permeated spacer 4. By way of example, a matrix material suitable for such construction includes e.g., Vibrathane B836 brand urethane from Chemtura Corporation of Middlebury, Conn.

The resulting casting of wheel 401 is then provided with a tread band or tread portion 410 to complete the process of manufacturing a structurally supported, non-pneumatic wheel. In an exemplary alternative method of the present invention, the casting of the annular reinforcement structure could be positioned in tread portion 410 using an interference fit before placing both into a wheel mold of the desired configuration. Such a method could help eliminate interference issues between the spokes 420 and/or band 425 during loading and closing of the wheel mold.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of manufacturing a non-pneumatic tire having an annular reinforcement structure that includes a first reinforcement band, a second reinforcement band, and a resilient spacing element positioned between the first and second reinforcement bands, the method comprising the steps of:
   placing the resilient spacing element against a face of the first reinforcement band;
   compressing the spacing element against the face of the first reinforcement band at a location adjacent a top edge of the first reinforcement band;
   sliding the second reinforcement band in an axial direction relative to the first reinforcement band and from the top edge of the first reinforcement band towards a bottom edge of the first reinforcement band while the spacing element is compressed so as to place the first and second reinforcement bands into a concentric relationship; and,
   allowing the spacing element to press against the first and second reinforcement band to retain the spacing element between the first and second reinforcement bands to form the annular reinforcement structure; and
   positioning the annular reinforcement structure within an annular band to form a non-pneumatic tire.

2. A method of manufacturing a non-pneumatic tire having an annular reinforcement structure as in claim 1, wherein said step of compressing comprises applying a jig to press against the spacing element.

3. A method of manufacturing a non-pneumatic tire having an annular reinforcement structure as in claim 2, wherein the jig comprises an annular band having a circumference that is intermediate in value relative to a circumference of the first reinforcement band and a circumference of the second reinforcement band.

4. A method of manufacturing a non-pneumatic tire having an annular reinforcement structure as in claim 2, wherein the jig has a width in the axial direction that is less than a width of the first reinforcement band in the axial direction and less than a width of the spacing element in the axial direction.

5. A method of manufacturing a non-pneumatic tire having an annular reinforcement structure as in claim 2, wherein the jig is comprised of a plurality of plates, which are spaced around a circumference of the first reinforcement band, each of the plates having a curved surface corresponding to a curvature of the first reinforcement band that engages the spacing element when the plates are moved from a retracted position to an extended position.

6. A method of manufacturing a non-pneumatic tire having an annular reinforcement structure as in claim 2, wherein the jig is an annular band.

7. A method of manufacturing a non-pneumatic tire having an annular reinforcement structure as in claim 1, wherein the spacing element has a thickness in the radial direction that is greater than the radial distance between the first and second reinforcement bands when the bands are in a concentric relationship.

8. A method of manufacturing a non-pneumatic tire having an annular reinforcement structure as in claim 1, wherein the spacing element is an open-cell, polymer foam having a fraction of voids to net volume of 75% or greater.

9. A method of manufacturing a non-pneumatic tire having an annular reinforcement structure as in claim 1, wherein the spacing element is a reticulated, polyurethane foam having a fraction of voids to net volume of 90% or greater.

10. A method of manufacturing a non-pneumatic tire having an annular reinforcement structure as in claim 1, wherein the first and second reinforcement bands are each comprised of a cord selected from the group consisting of monofilament or multi-filament yarns, and the cord is wound into a helix making at least three revolutions.

11. A method of manufacturing a non-pneumatic tire having an annular reinforcement structure as in claim 1, wherein the spacing element comprises an annular band.

12. A method of manufacturing a non-pneumatic tire having an annular reinforcement structure as in claim 1, wherein the spacing element comprises a plurality of discrete shims arranged circumferentially along an inside surface of the outer reinforcement band.

13. A method of manufacturing a non-pneumatic tire having an annular reinforcement structure as in claim 1, further comprising the steps of:
   placing the first and second reinforcement bands and spacing element from said step of allowing into a mold; and,
   casting a matrix material into the mold that impregnates one or more of the first reinforcement band, the second reinforcement band, and the spacing element.

14. A method of manufacturing a non-pneumatic tire with an annular reinforcement structure that includes a first reinforcement band, a second reinforcement band, and a resilient spacing element positioned between the first and second reinforcement bands, the method comprising the steps of:

placing a resilient spacing element adjacent to the first reinforcement band and against a face of the first reinforcement band;

pressing the resilient spacing element against the face of the first reinforcement band;

sliding the second reinforcement band in an axial direction relative to the first reinforcement band and from a first edge of the first reinforcement band towards a second edge of the first reinforcement band during said step of pressing such that the first and second reinforcement bands are placed into a concentric relationship; and, releasing the spacing element to press against the first and second reinforcement band and retain the spacing element between the first and second reinforcement bands to form the annular reinforcement structure; and positioning the annular reinforcement structure within an annular band to form a non-pneumatic tire.

15. A method of manufacturing a non-pneumatic tire with an annular reinforcement structure as in claim 14, further comprising the step of embedding the spacing element and the first and second reinforcement bands within a matrix material.

16. A method of manufacturing a non-pneumatic tire having an annular reinforcement structure as in claim 14, wherein the spacing element comprises an annular band.

17. A method of manufacturing a non-pneumatic tire having an annular reinforcement structure as in claim 14, wherein the spacing element comprises a plurality of discrete shims arranged circumferentially along an inside surface of the outer reinforcement band.

* * * * *